(12) United States Patent
Wegner et al.

(10) Patent No.: US 6,820,760 B2
(45) Date of Patent: Nov. 23, 2004

(54) ELECTRICAL BOX EXTENSION

(76) Inventors: Wesley Gene Wegner, 3486 Robin Hill St., Thousand Oaks, CA (US) 91360; Paul Brett Wegner, 6037 W. 78th St., Los Angeles, CA (US) 90045

(\*) Notice: Subject to any disclaimer, the term of this patent is extended or adjusted under 35 U.S.C. 154(b) by 0 days.

(21) Appl. No.: 10/349,746

(22) Filed: Jan. 21, 2003

(65) Prior Publication Data

US 2004/0155036 A1 Aug. 12, 2004

Related U.S. Application Data

(63) Continuation-in-part of application No. 10/144,210, filed on May 13, 2002, now abandoned.
(60) Provisional application No. 60/370,419, filed on Apr. 4, 2002.

(51) Int. Cl.$^7$ ................................................. H02G 3/08
(52) U.S. Cl. ..................... 220/3.94; 174/57; 220/3.7; 220/4.03
(58) Field of Search .................... 220/3.94, 4.03, 220/3.7, 3.2, 3.3, 3.9; 174/57

(56) References Cited

U.S. PATENT DOCUMENTS

| | | | | |
|---|---|---|---|---|
| 740,663 A | * | 10/1903 | Krantz ................... | 220/3.7 |
| 754,414 A | * | 3/1904 | Bossert ................... | 220/3.7 |
| 1,688,518 A | * | 10/1928 | Bennett .................. | 220/3.7 |
| 2,886,630 A | * | 5/1959 | Gill ....................... | 174/57 |
| 2,989,206 A | * | 6/1961 | McAfee ................... | 220/3.7 |
| 3,006,216 A | * | 10/1961 | Sisson et al. ........... | 74/665 R |
| 3,319,919 A | * | 5/1967 | Eisenberg ................ | 248/343 |
| 3,433,886 A | * | 3/1969 | Myers .................... | 174/57 |
| 4,634,015 A | * | 1/1987 | Taylor .................... | 220/3.7 |
| 4,685,037 A | * | 8/1987 | Akiyama et al. ........ | 362/276 |
| 5,012,043 A | * | 4/1991 | Seymour ................. | 174/57 |
| 5,042,673 A | | 8/1991 | McShane | |
| 5,117,996 A | | 6/1992 | McShane | |
| 5,293,003 A | | 3/1994 | Prairie et al. | |
| 5,736,674 A | | 4/1998 | Gretz | |
| 5,931,325 A | * | 8/1999 | Filipov ................... | 220/3.7 |
| 5,959,246 A | | 9/1999 | Gretz | |
| 5,975,323 A | | 11/1999 | Turan | |
| 6,180,879 B1 | | 1/2001 | Gretz | |
| 6,204,447 B1 | | 3/2001 | Gretz | |
| 6,307,154 B1 | | 10/2001 | Gretz | |
| 6,457,914 B1 | * | 10/2002 | Andras et al. .......... | 407/105 |

\* cited by examiner

*Primary Examiner*—Joseph C Merek
(74) *Attorney, Agent, or Firm*—Michael Blaine Brooks, P.C.; Michael B. Brooks

(57) ABSTRACT

Disclosed is an electrical box extension that includes an extending member for switch and/or plug mounting having one or more fastening brackets, one or more base fastening brackets and one or more fasteners that together with optional contact points provide for mechanical and electrical connectivity between the extending member and its associated electrical box and provide sufficient mechanical resistance to support the adjustable elevation of the elevating member thereby supporting a flush surface for surface mounted sockets, switches and their associated plates.

21 Claims, 32 Drawing Sheets

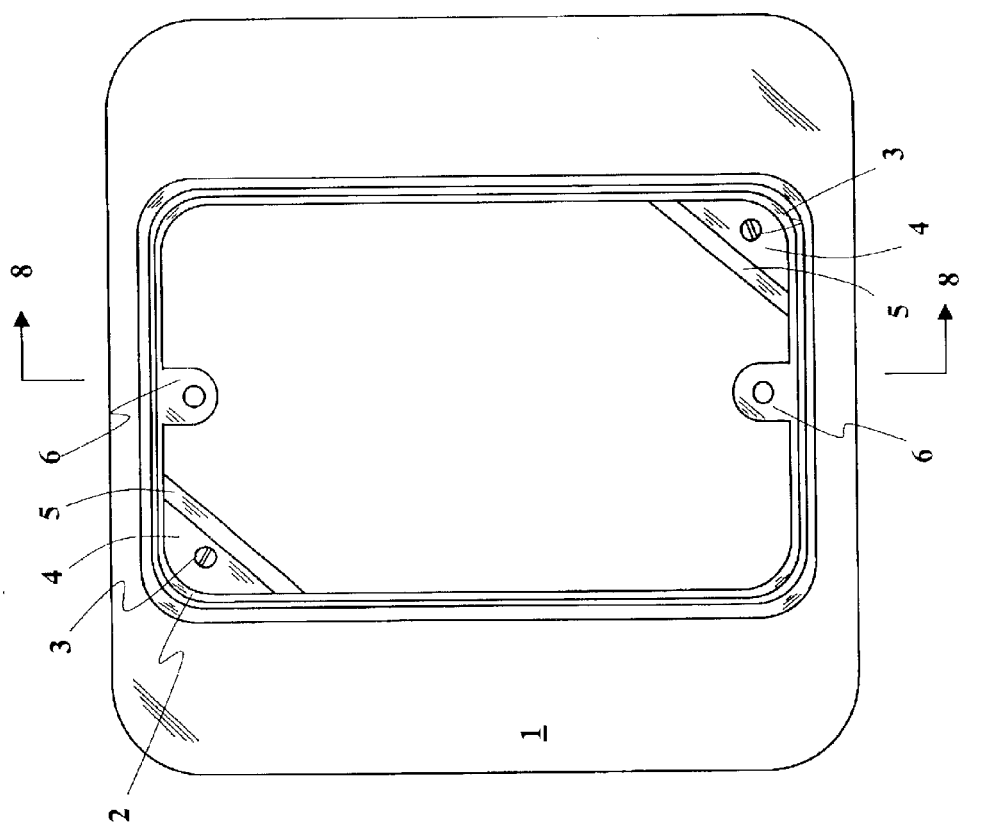

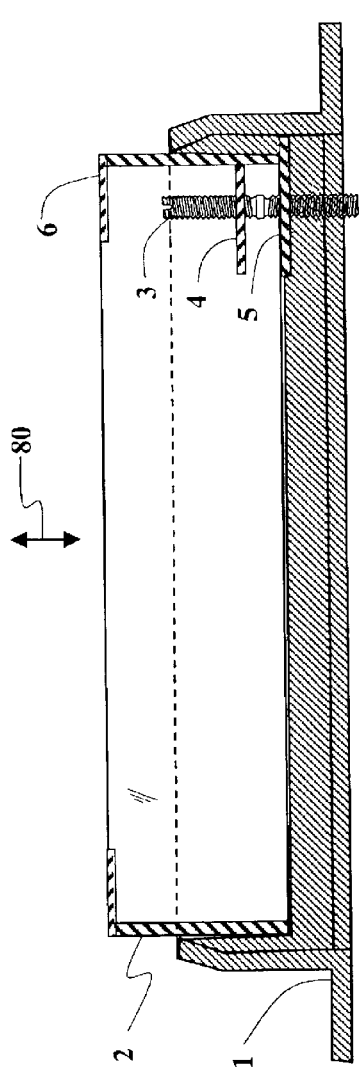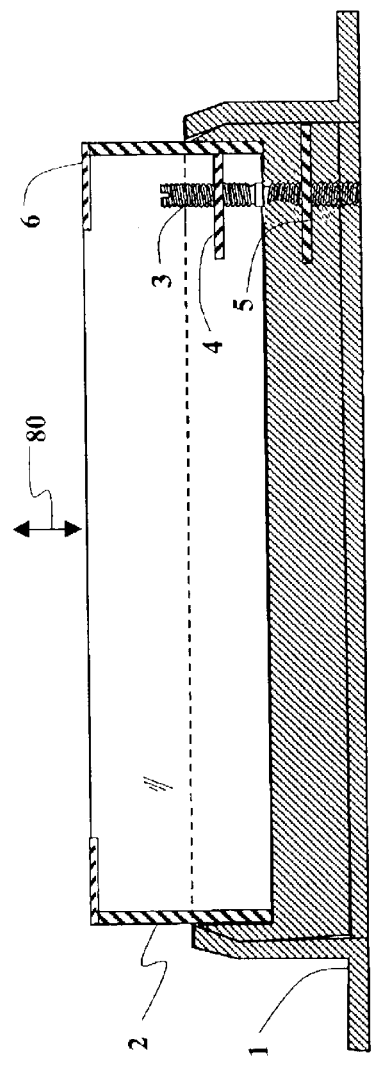
FIG. 2A
FIG. 2B

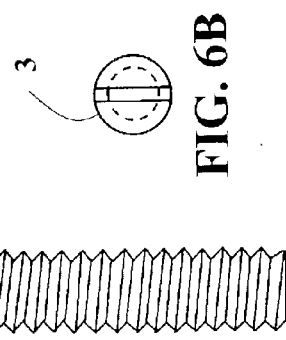
FIG. 6B
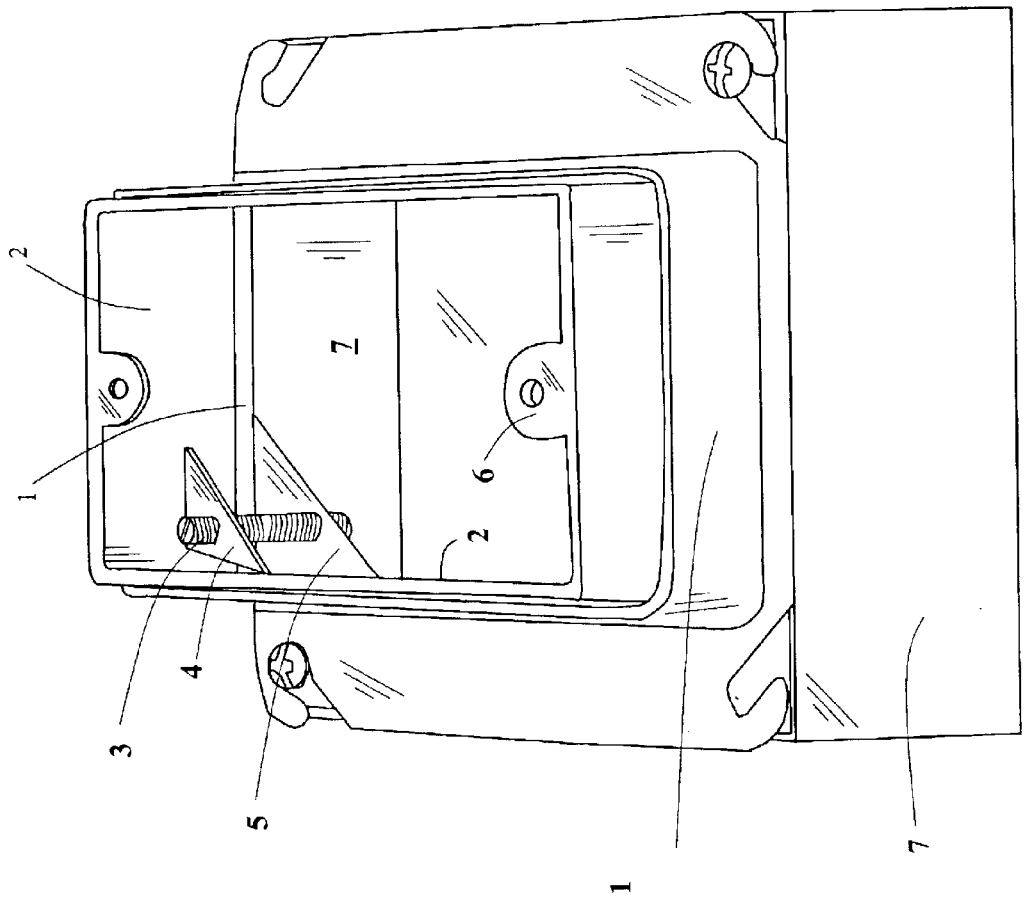
FIG. 6A
FIG. 5

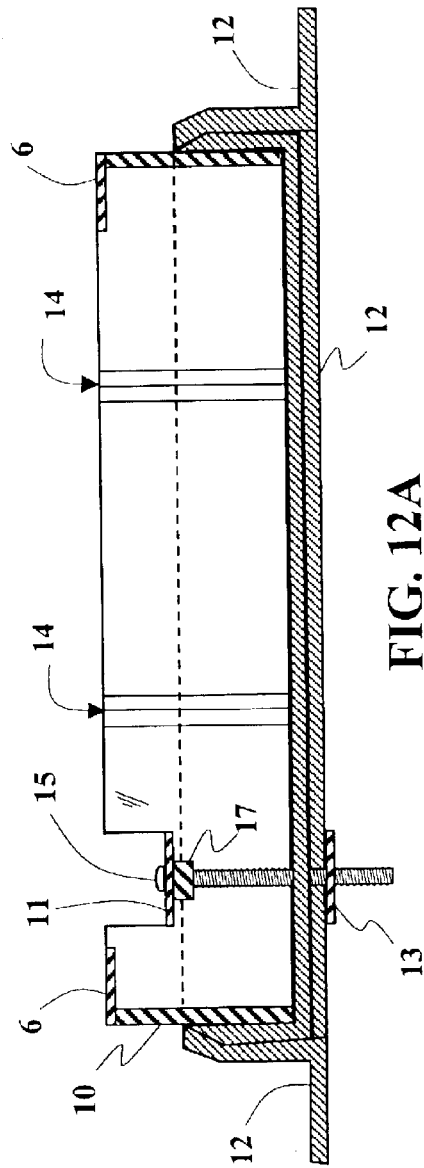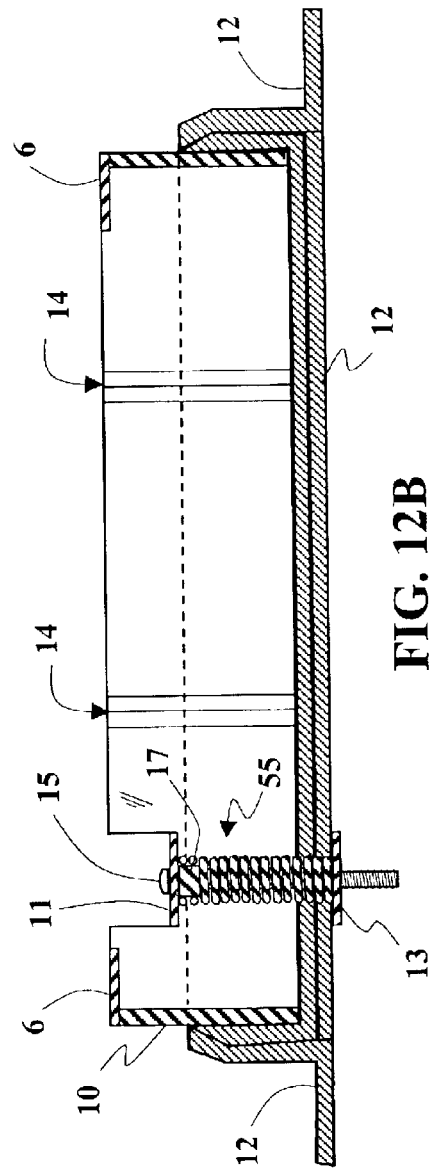

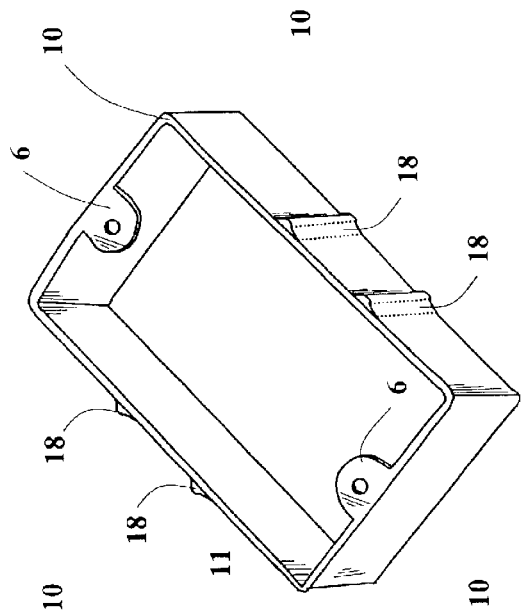
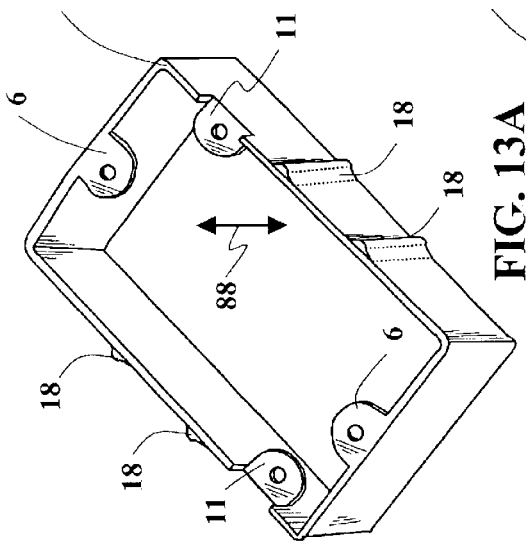
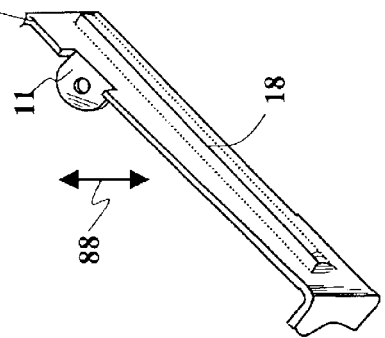
FIG. 13A
FIG. 13B
FIG. 14

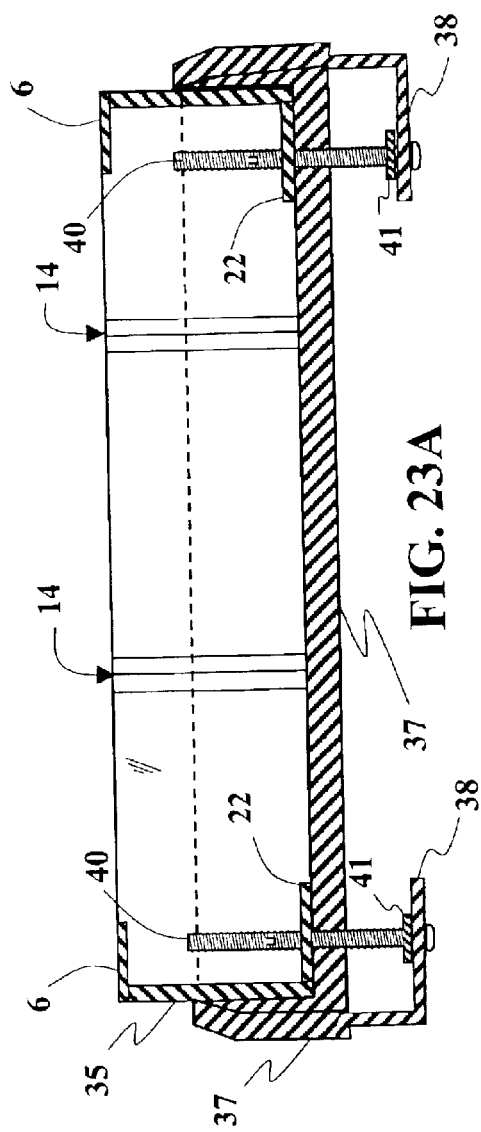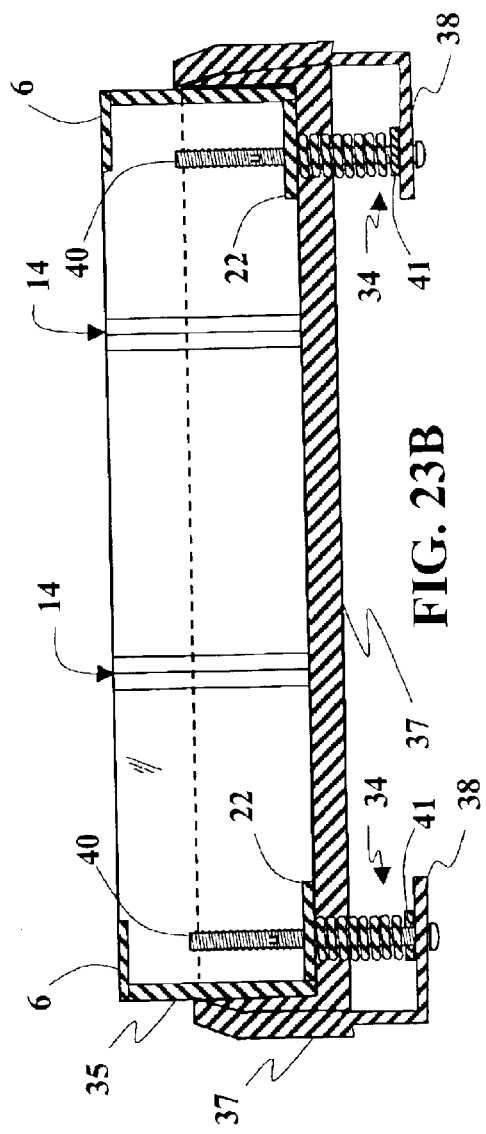

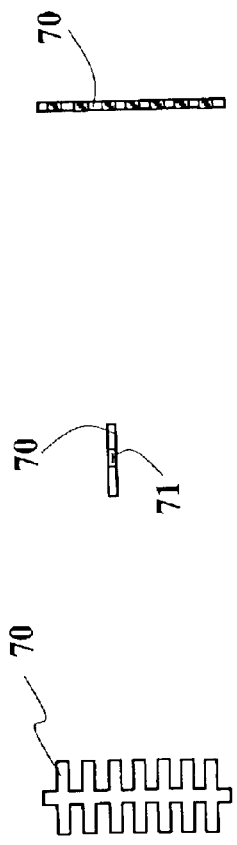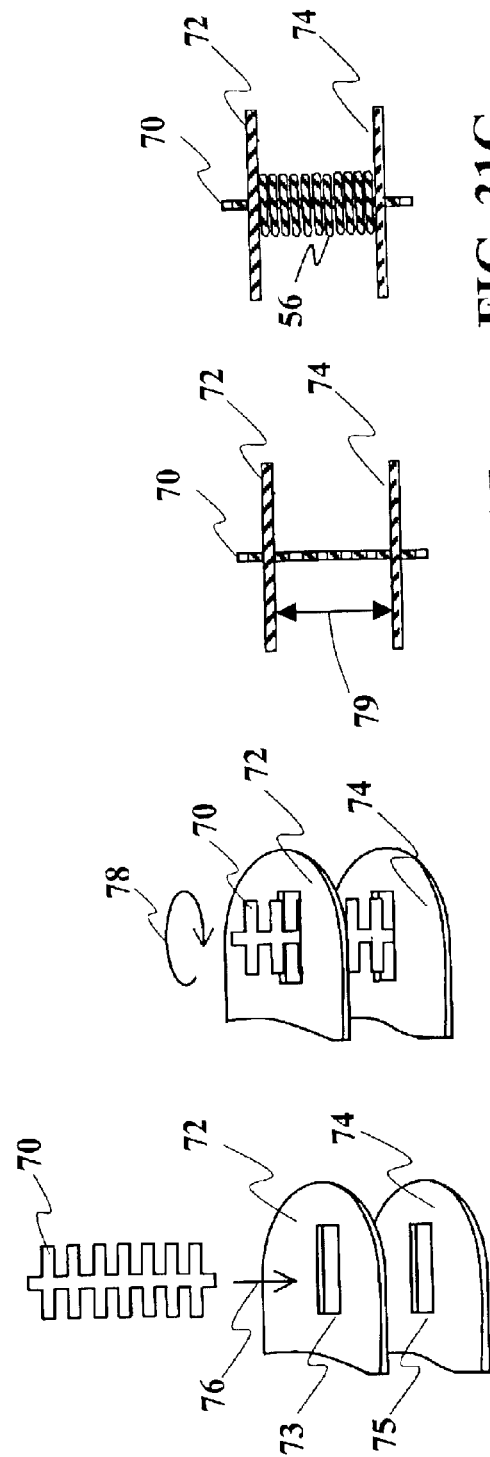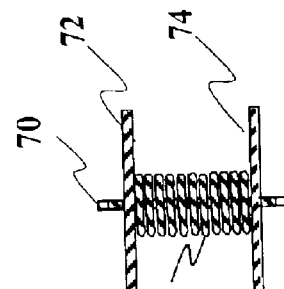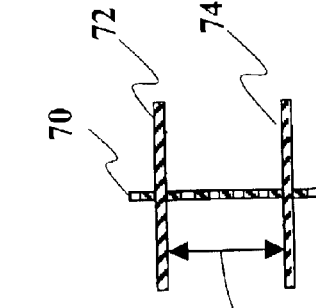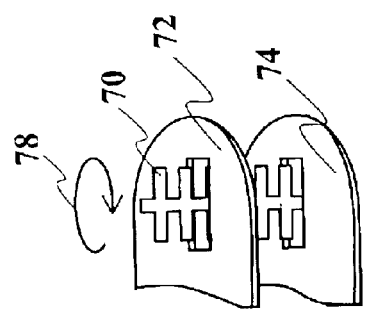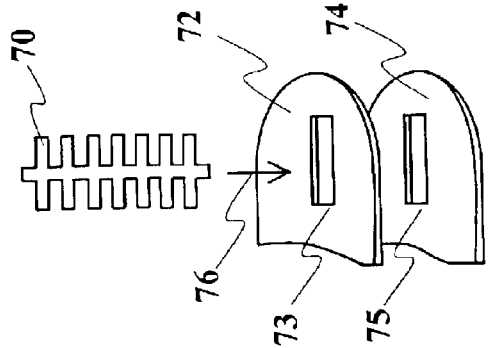

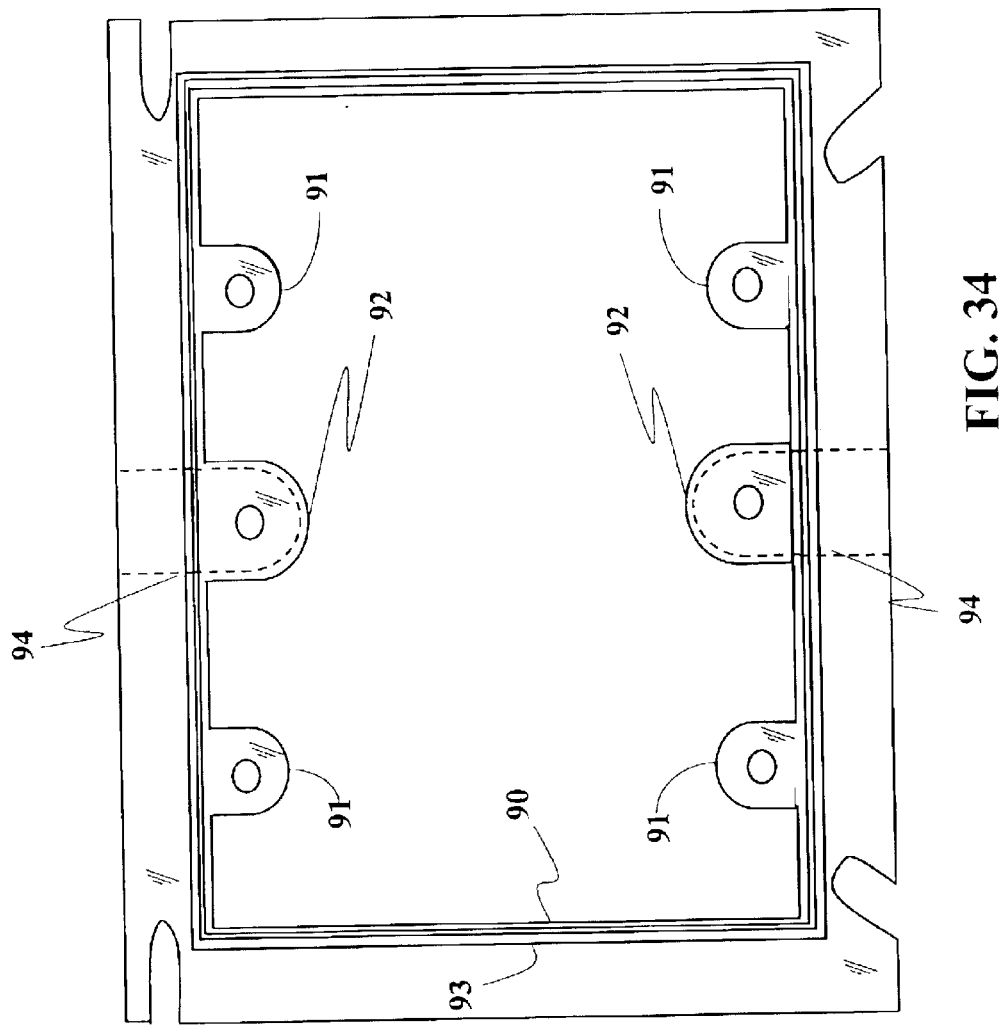

ELECTRICAL BOX EXTENSION

CROSS REFERENCE TO RELATED APPLICATIONS

This application is a continuation-in-part of application Ser. No. 10/144,210 filed May 13, 2002 now abandoned, and claims the benefit of provisional application No. 60/370,419 to Wesley Gene Wegner and Paul Brett Wegner entitled, "ELECTRICAL BOX EXTENSION," filed Apr. 4, 2002, both applications of which are specifically hereby incorporated herein, in their entirety, by reference for all purposes.

BACKGROUND

This invention generally relates to electrical equipment for housing electrical devices such as switches and outlets, and particularly to electrical box extensions.

Electrical boxes are commonly used to provide electrical service at convenient locations within buildings. The electrical boxes are commonly formed of plastic or metal and are usually securely fastened by screws or nails to the framework of a structure being prepared for electrification. In newly constructed buildings, the open face of the electrical box, within which an electrical device such as an outlet or switch will be mounted, is usually flush with the surface of the wall or ceiling in which it is installed.

When buildings are renovated or restored or otherwise modified from their original wall and ceiling surfaces, it is common for renovators to lay down new sheet stock such as sheet rock, paneling, and the like, over the existing ceilings or walls. This process of layering causes the existing electrical boxes to become recessed within the built-up wall by the thickness of the new sheet stock. A need for extension therefore occurs when the box or mud ring has been placed and then tile, brick or some other wall covering is added thereby causing the screw mounts for plugs and/or switches to be recessed within the wall.

To solve this problem, box extenders of several different types have been developed. One type relies on a friction fit to hold the box extender in the existing electrical box. This extender does not provide a secure attachment to the existing box and may allow an attached electrical device to slide further within the box as the extender will slide based on an external force.

Another type of extender consists of an extension having walls of approximately the same configuration as the existing box and of fixed depths of extension. The extender is available in several depths to accommodate several different sheet stock thicknesses. Although there are several depths available, the depth is not continuously variable resulting in an inability to consistently provide a depth extension bringing the existing box flush with the outer wall surface.

Another type of extender includes a body portion having at least one wall and open faces. The extender includes side flanges having holes that align with brackets that are connected to the electrical box. This extender is difficult to use and install as brackets must be firmly attached to the electrical box and then two screws are used to attach each flange of the extender to the electrical box.

There remains a need to extend the electrical box with a minimal number of parts that provide ready height adjustment while maintaining mechanical and structural soundness and electrical connectivity including ground, and thereby compensate for add-ons to a wall that cause depth to be added between the box or ring and the outer wall.

SUMMARY

Disclosed is an electrical box extension including an extending member with one or more fastening brackets, one or more fastening brackets and one or more elevating fasteners such as a double reverse screw or a standard threaded screw with attached grommet for mechanically connecting and, in the case of the double reverse screw electrically connecting, the extending member and the box via the fasteners, brackets, and/or ridges and thereby providing sufficient mechanical resistance to support the adjustable elevation of the extending member and providing a flush surface for surface mounted sockets, switches and their associated plates. Where a standard threaded screw is used or in embodiments without elevating fasteners or without loaded springs, the extending member provides electrical connectivity via one or more protrusions or projections from the sleeve against an electrical box and/or adapting member.

BRIEF DESCRIPTION OF THE DRAWINGS

For a more complete understanding of the present invention and for further features and advantages, reference is now made to the following description taken in conjunction with the accompanying drawings, in which:

FIG. 1 is a top view of a reverse screw embodiment of the present invention;

FIG. 2A is a cross-sectional view of a reverse screw embodiment of the present invention;

FIG. 2B is a cross-sectional view of a reverse screw embodiment of the present invention in partial extension;

FIG. 5 is a perspective view of a reverse screw embodiment of the present invention mounted on an electrical box;

FIG. 6A is a side view of a reverse screw used in an embodiment of the present invention;

FIG. 6B is a top view of a reverse screw used in an embodiment of the present invention;

FIG. 12A is a cross-sectional view of an assembly of an alternative embodiment of the present invention;

FIG. 12B is a cross-sectional view of an assembly of an alternative embodiment of the present invention;

FIG. 13A is a perspective view of an extending member of an alternative embodiment of the present invention;

FIG. 13B is a perspective view of an extending member portion of an alternative embodiment of the present invention;

FIG. 14 is a perspective view of an extending member of an alternative embodiment of the present invention;

FIG. 23A is a cross-sectional view of an assembly of an alternative embodiment of the present invention;

FIG. 23B is a cross-sectional view of an assembly of an alternative embodiment of the present invention;

FIG. 31A is a front view of an elevating fastener of an alternative embodiment of the present invention;

FIG. 31B is a top view of an elevating fastener of an alternative embodiment of the present invention;

FIG. 31C is a side view of an elevating fastener of an alternative embodiment of the present invention;

FIG. 31D is a perspective view of an elevating fastener proximate to receiving brackets of an alternative embodiment of the present invention;

FIG. 31E is a perspective view of an elevating fastener inserted within receiving brackets of an alternative embodiment of the present invention;

FIG. 31F is a perspective view of an elevating fastener engaged between receiving brackets of an alternative embodiment of the present invention;

FIG. 31G is a perspective view of an elevating fastener engaged between receiving brackets of an alternative embodiment of the present invention;

FIG. 34 is a top view of two-gang assembly embodiment of the present invention.

DETAILED DESCRIPTION OF THE INVENTION

Figure 2C:
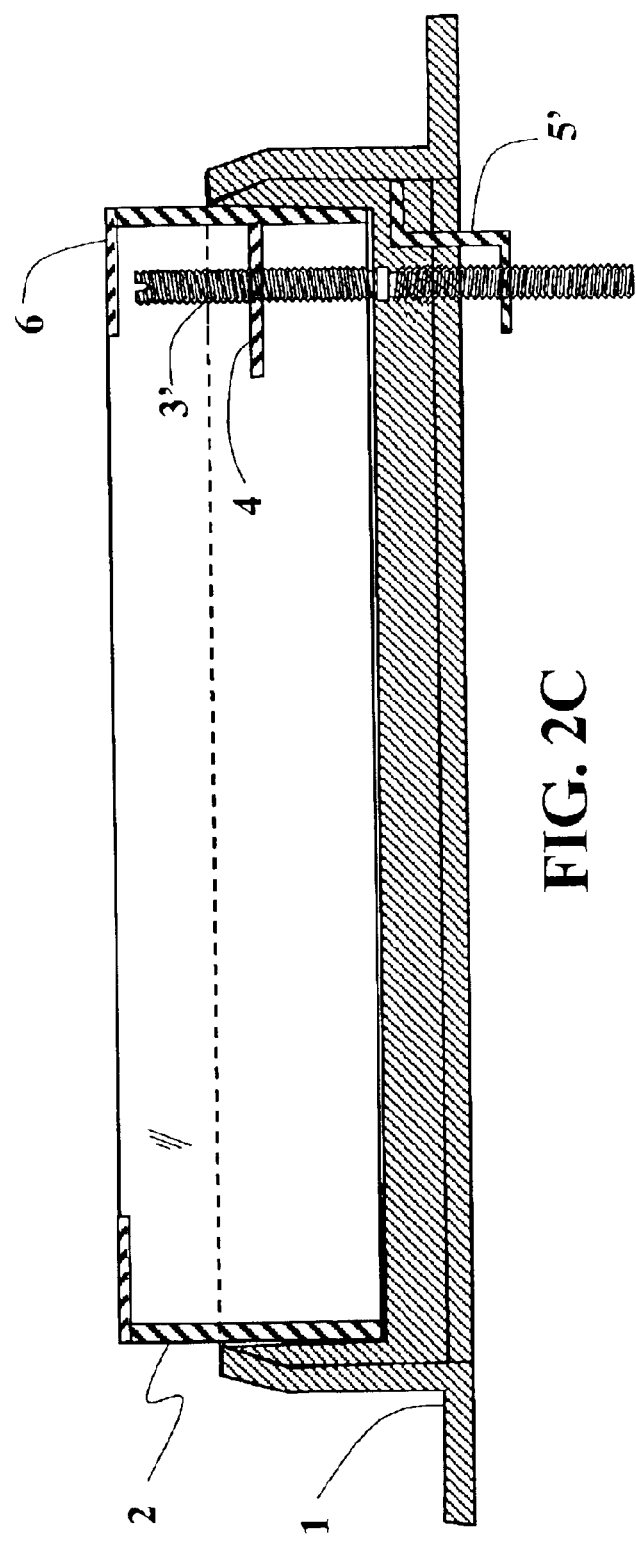
FIG. 2C is a cross-sectional view of an alternative reverse screw embodiment of the present invention.

The extending member, or sliding tubular member, is an attachable or otherwise adjustable element of an assembly comprised of the extending member and a mud ring, adapting member or electrical box. A first embodiment has at least two sets of mounting brackets, placed in each of two diametrically opposed corners. One bracket is placed at the base of the ring and extends into the open portion of the ring. The second bracket is preferably placed proximate to the base of the extending member to maximize screw/extending member travel. An alternative embodiment has the second bracket approximately midway between the base and top of the extending member. Each bracket has a tapped entry for a combination left-right thread screw. By turning either screw, the extension is elevated or lowered such that the outer edge of the extension is made substantially flush with the wall surface. The design of the brackets and screw mounting effects a solid ground and satisfies the electrical grounding requirements. Embodiments without the fasteners use protrusions from the extension and/or the ring to maintain the electrical grounding. Additional sets of mounting brackets may be required depending primarily upon the ring/box size. For example, an example two-gang article has mounting brackets on the middle portion of each of the opposite inner sides of the adapting member.

FIG. 1 illustrates the upper screw mounting plates 4 or brackets and lower screw mounting plates 5 or brackets of the present invention that are placed such that fastener such as a reverse thread screw 3 connects at least two brackets, the upper bracket 4 and the lower bracket 5, and when rotated, the screw 3 works to lower and raise the sleeve or extending member 2 relative to the mud ring or adapting member 1. While a reverse thread screw 3 is shown as the fastener, other fasteners of adjustable height that provide mechanical and electrical connectivity may be substituted. The extending member 2, extension or sleeve is shown is a tubular member with a transversal shape that is substantially rectangular. The transversal shape of the extension may also be circular, oval or multifaceted depending upon the adapting member to which it is attached. The switch/plug screw plates 6 are a part of the extension 2 or the extension 2 is embodied alternatively such that the end portions of the extension 2 fit about the plates 6. In the preferred embodiment, the lower bracket 5 is fixedly attached to the adapting member 1. Alternatively, the lower bracket 5 may be fixedly attached to an electrical box (not shown) or similar housing.

FIG. 2A is a cross-sectional view 8 of FIG. 1 that illustrates the manner in which a screw 3 engages the upper mounting bracket 4 and lower mounting bracket 5. The lower bracket 5 is fixedly attached to the mud ring or adapting member 1. The upper bracket 4 is fixedly attached to the sleeve, extension, or extending member 2. By turning the one or more screws 3, the extension 2 rises or falls along the axis of extension and retraction 80 depending upon the direction of turn of the one or more screws 3. An extending member elevated with respect to the adapting member is illustrated in FIG. 2B. An alternative embodiment illustrated in FIG. 2C, the lower bracket 5' is attached to the ring 1, but configured with an extending portion to support greater screw travel and longer reverse thread screws 3'.

Figure 3:
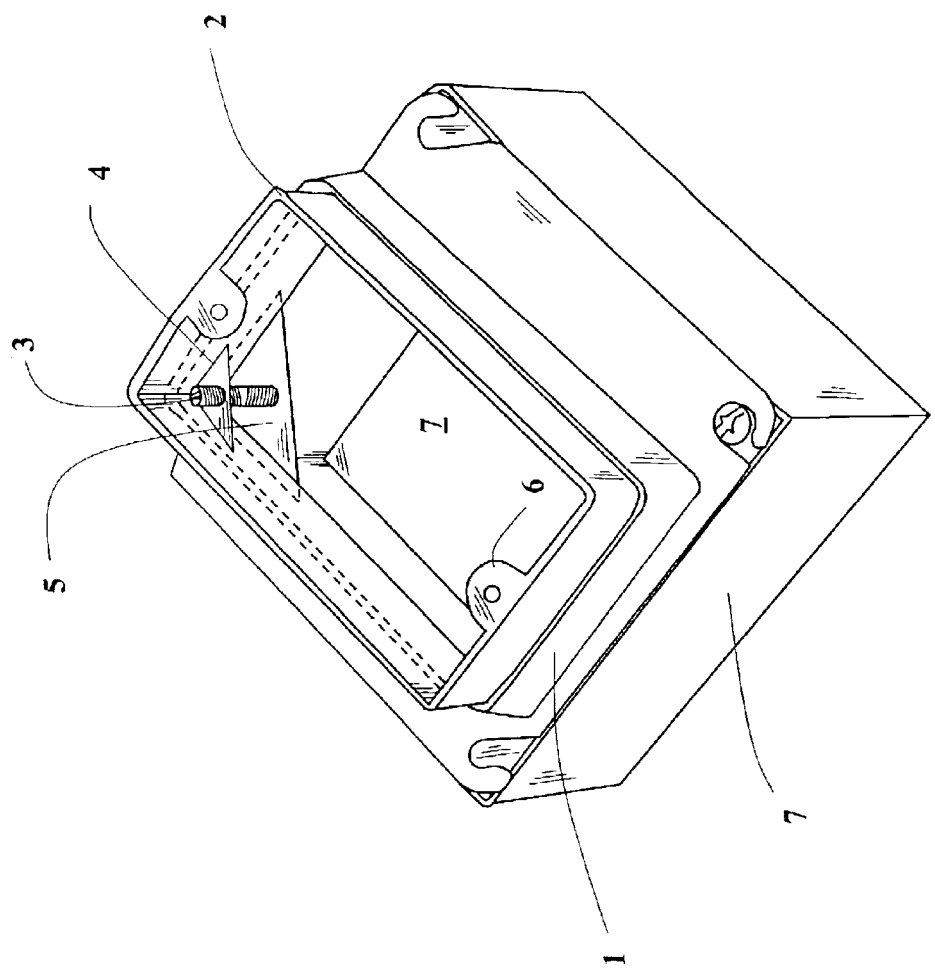
FIG. 3 is a perspective view of a reverse screw embodiment of the present invention mounted on an electrical box.
Figure 4:
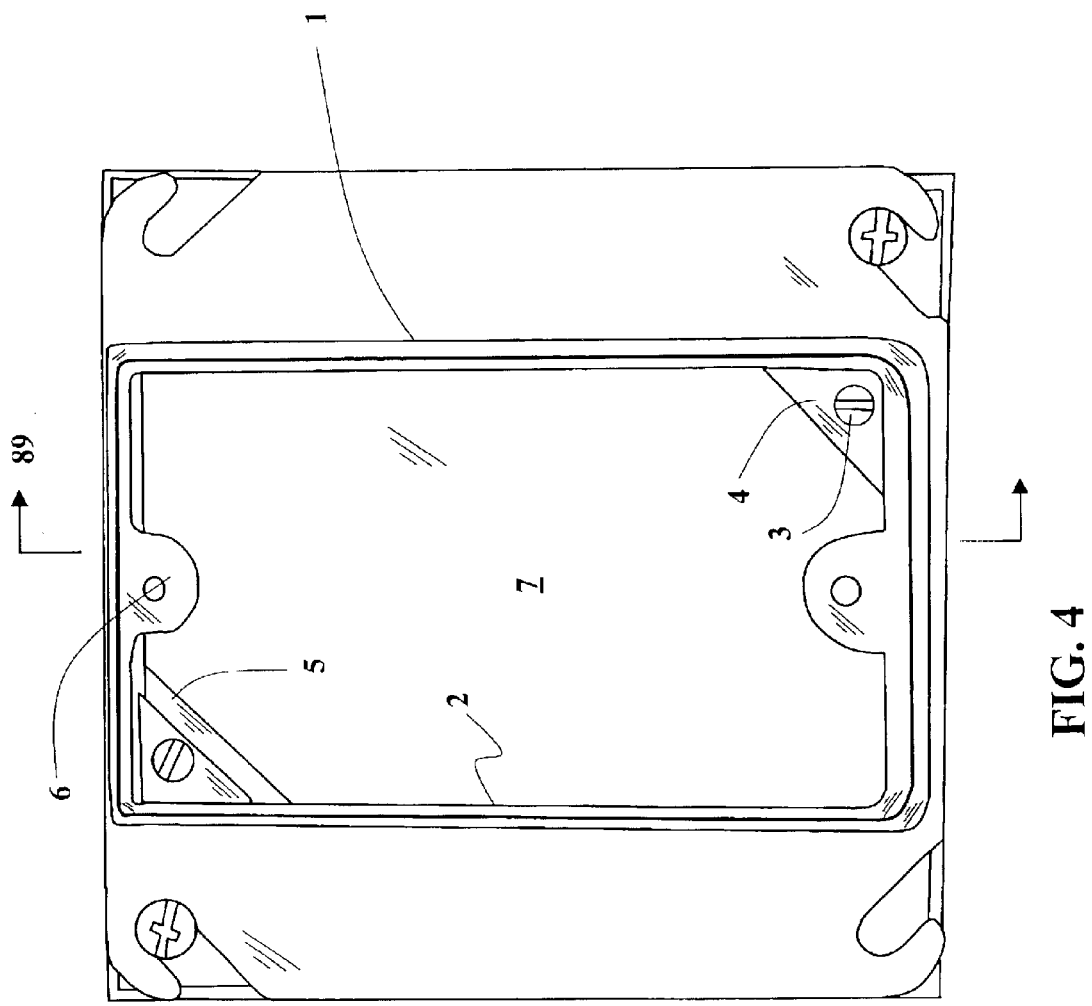
FIG. 4 is a top view of a reverse screw embodiment of the present invention mounted on an electrical box.

FIGS. 3–5 illustrate an embodiment of the present invention from various perspectives as it is mounted on an electrical box 7. FIG. 3 provides a perspective view of an embodiment of the present invention mounted on an electrical box 7. The extending member 2 is shown within the flange of the adapting member 1. A screw 3 as an example fastener is visible mechanically connecting the extension 2 to the ring 1 by way of a lower bracket 5 fixedly attached to the ring 1 and an upper bracket 4 fixedly attached to the extending member 2. The upper and lower brackets are also referred to as a set or pair of brackets 4 and 5. FIG. 4 provides a top view of the present invention mounted on an electrical box and shows the preferred embodiment with a screw 3 and pair of brackets 4 and 5 diagonally opposed from a second screw 3 and pair of brackets. The lower bracket 5 may, in an alternative embodiment, be fixedly attached to the box 7 and is illustrated below (FIG. 7A) in cross-sectional view 89. FIG. 5 is a perspective view of an embodiment of the present invention mounted on an electrical box and illustrating a typical travel of the extending member 2 relative to the remaining screw thread.

In the preceding example embodiment, fasteners are used to provide mechanical and electrical contact and provide for the adjusting of the sliding or extending member. FIGS. 6A and 6B illustrate side and top views 9 of the reverse thread screw 3 of an embodiment of the present invention. The screw length selected depends upon the particular embodiment used as is described in detail below.

Figure 7A:
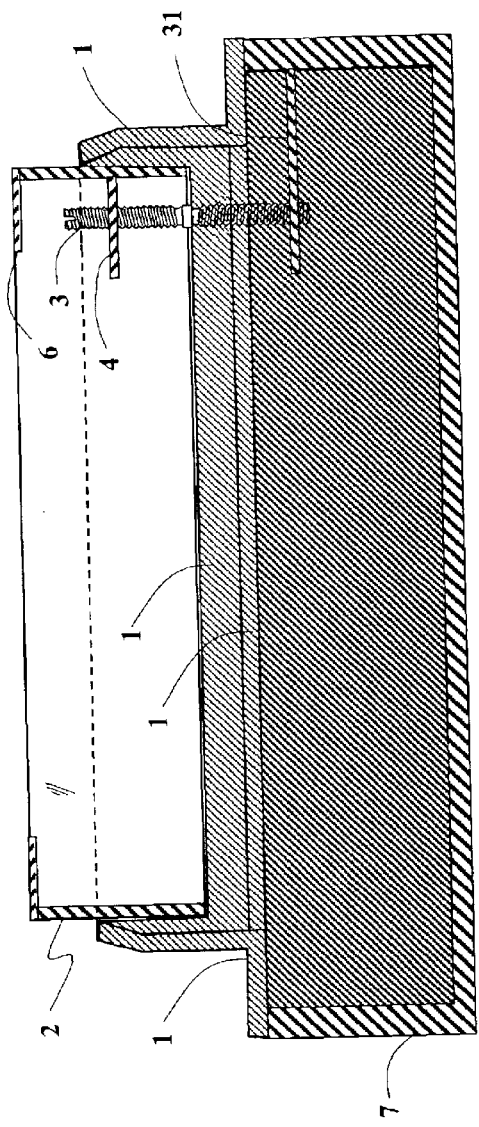
FIG. 7A is a cross-sectional view of an alternative embodiment of the present invention having a bracket attached to the electrical box.
Figure 7B:
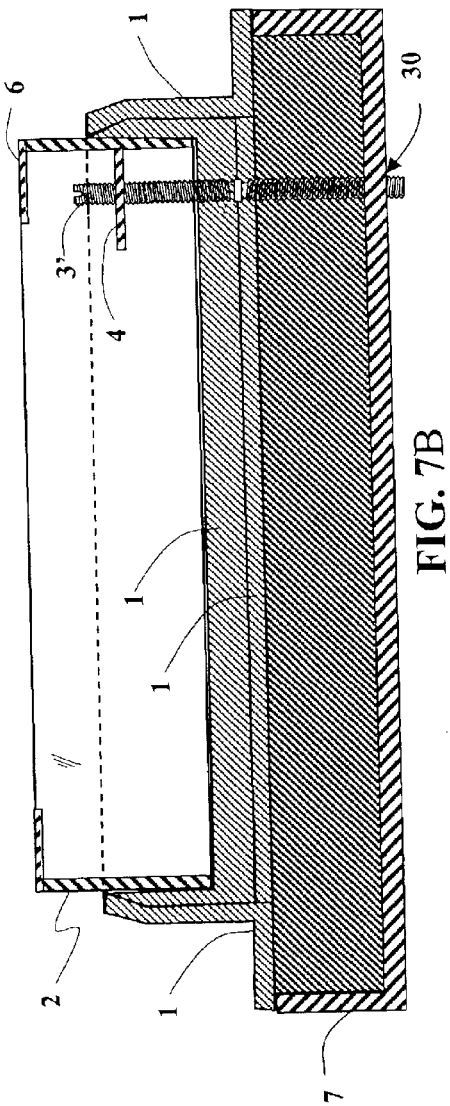
FIG. 7B is a cross-sectional view of an alternative embodiment of the present invention engaging an electrical box.
Figure 7C:
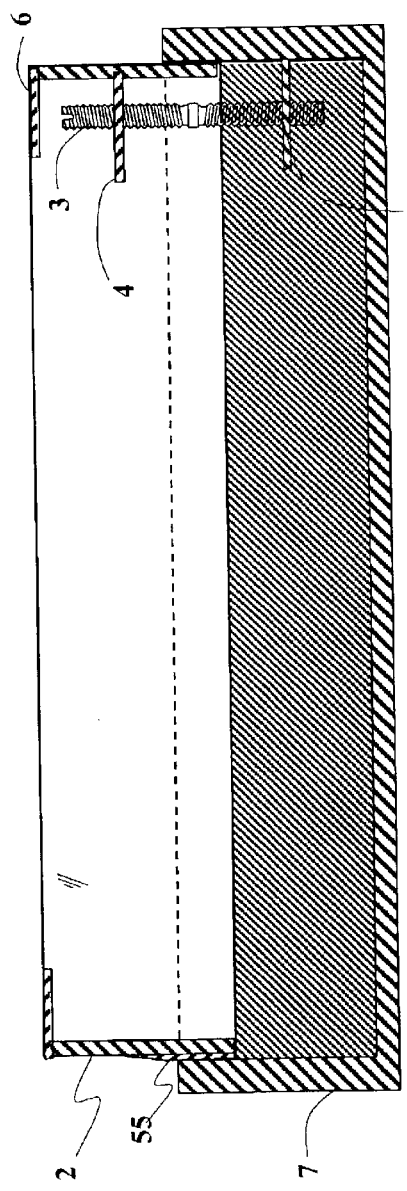
FIG. 7C is a cross-sectional view of an alternative embodiment of the present invention engaging an electrical box.
Figure 7D:
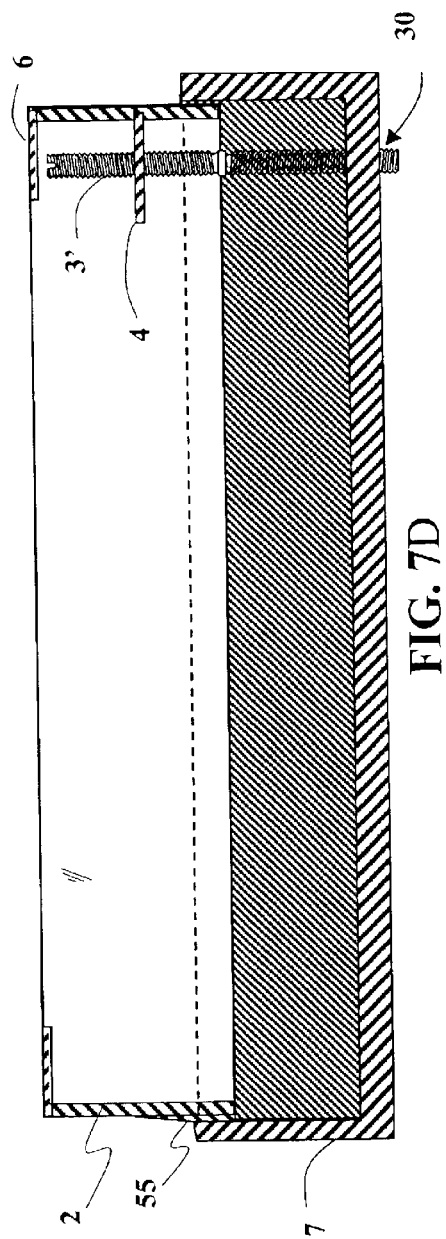
FIG. 7D is a cross-sectional view of an alternative embodiment of the present invention engaging an electrical box.

Rather than the one or more lower brackets 5 (FIG. 2A) being fixedly attached to the ring 1, in an alternative embodiment of the present invention, the one or more lower brackets 5' (FIG. 2B) are fixedly attached to the box 7 shown in FIG. 7A in cross-section view 89 (FIG. 4). The extending member 2 remains in electrical and mechanical contact with the box by way of the one or more screws 3 as disclosed above by engaging the one or more upper brackets 4 and the one or more lower brackets 31. Depending on the dimensions of the box 7 relative to the extending member 2, a ring 1 or other adapting member thereby becomes optional in this alternative embodiment as a separate member and otherwise the functionality of the ring 1 is taken on by the box 7. An alternative embodiment illustrated in FIG. 7B has at least one tapped aperture 30 of the electrical box 7 rather than the one or more lower brackets 31 for engaging the screw 3'. FIG. 7C illustrates an embodiment where in place of an adapting member or ring, the electrical box has a mounting surface or bracket 31 and the extending member or slider 2 is in close proximity to the walls of the box 7. Mechanical and electrical contact illustrated in FIGS. 7C and 7D is enhanced where the embodiments include one or more protrusions 55 from the slider 2 outer surface contacting at least one of the inside walls of the box 7.

Figure 8:
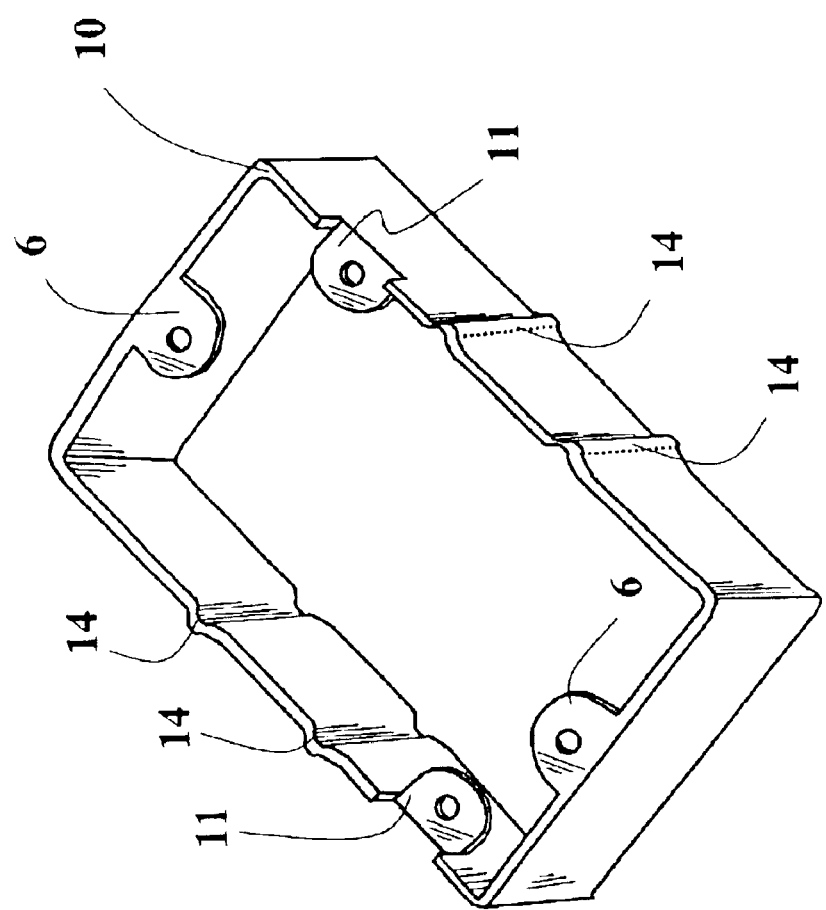
FIG. 8 is a perspective view of an extending member of an alternative embodiment of the present invention.
Figure 9:
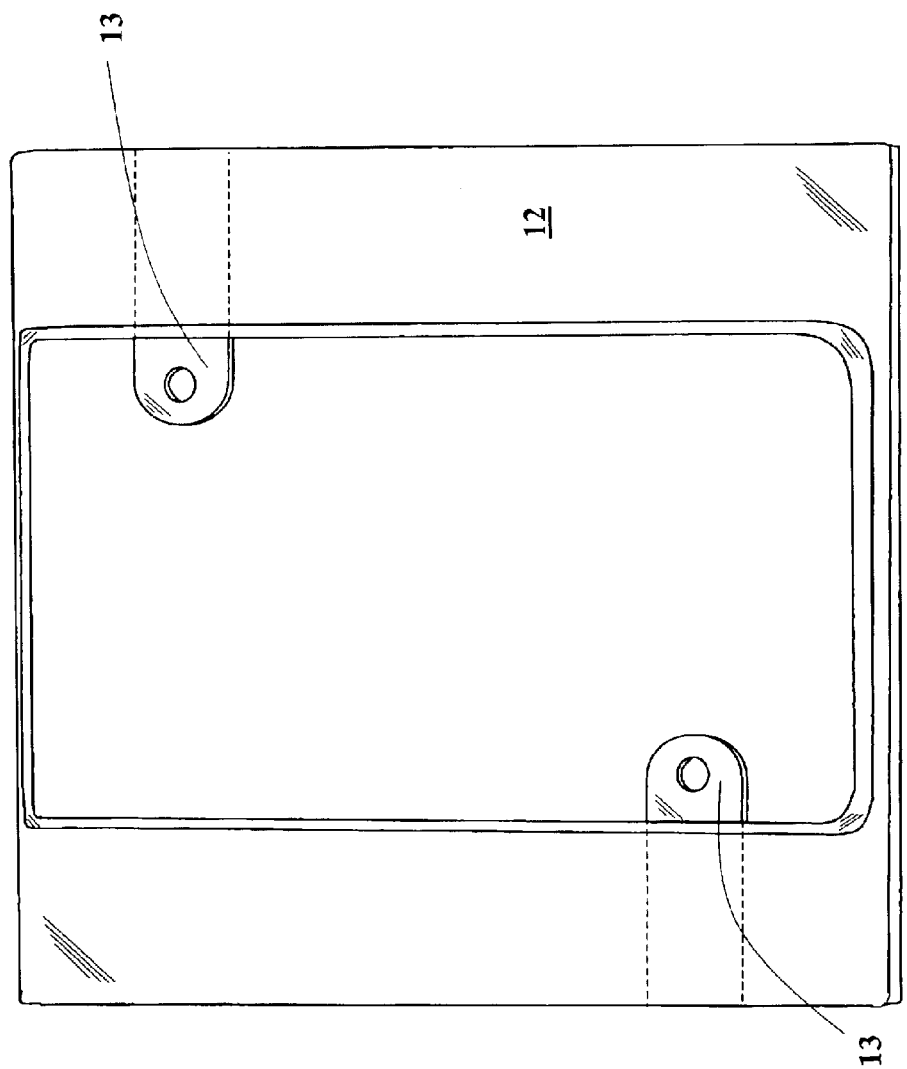
FIG. 9 is a top view of a mud ring member of an alternative embodiment of the present invention.

An alternative embodiment of the present invention illustrated in FIG. 8 has a sliding member 10 with a plurality of protrusions 14 stamped into the sliding member wall. The protrusion is produced by at least one of several fabricating means including bending the extension, punching the extension and the build-up of electrically conductive material. In this embodiment, the sliding member is attached and its elevation relative to a mounting surface adjusted with fasteners (not shown) inserted into attachment surface 11. A ring 12 is illustrated in FIG. 9 where additional attachment surfaces 13 are provided by the ring 12. Preferably, the mounting surfaces 13 are part of a stamped die comprising the ring 12 with extended tabs 13 that are subsequently folded back and under the main portion of the ring 12 or stamped so as to protrude into the main aperture and so as to be aligned with the attachment surfaces 11 of the sliding member 10 (not shown).

Figure 10:
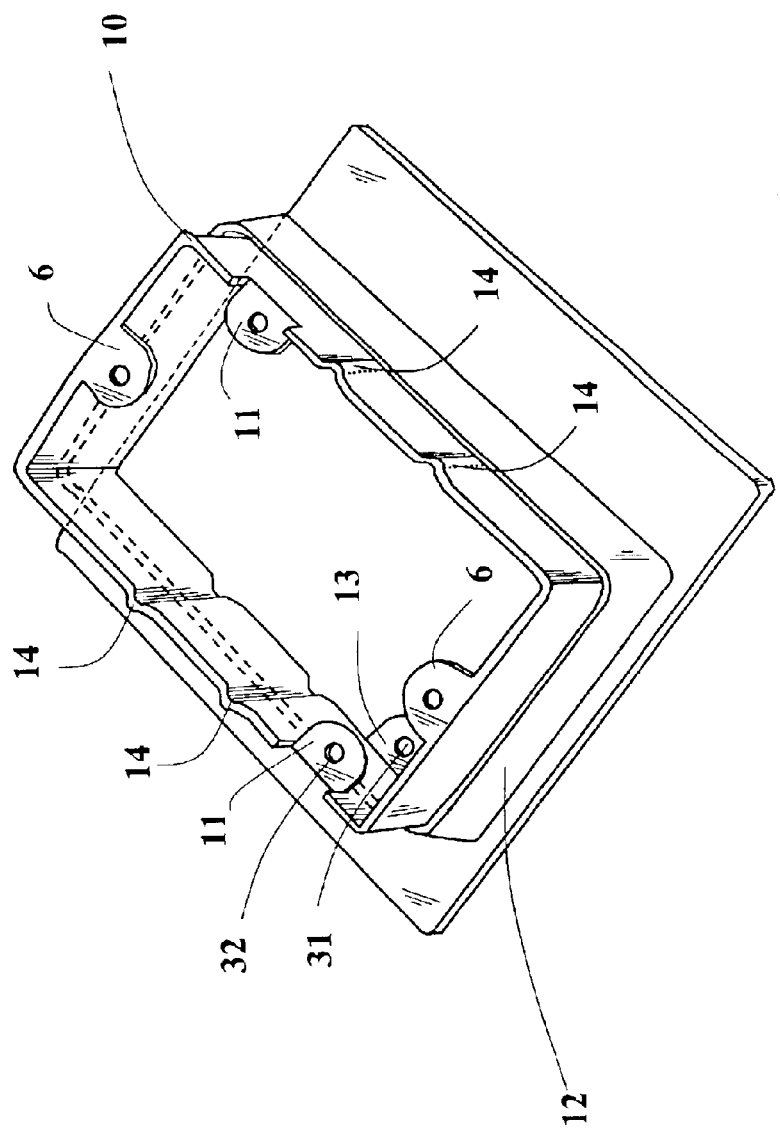
FIG. 10 is a perspective view of an extending member within a mud ring member of an alternative embodiment of the present invention.

FIG. 10 illustrates the sliding member 10 inserted into the main aperture of the ring 12. The protrusions of the sliding member 14 are in contact with the inner wall of the ring 12 and thereby provide electrical and mechanical contact between the ring 12 and the sliding member. The aperture 31 of the attachment surface 11 of the sliding member 10 and the aperture 32 of the attachment surface 13 of the ring 12 are aligned such that fasteners 15 (not shown) such as machine screws are able to connect the surfaces by insertion into the apertures 31, 32 of the surfaces 11, 13. While both the apertures of the attachment surfaces 11 of the sliding member 10 and the attachment surfaces 13 of the ring 12 may be tapped to engage a screw, a preferred embodiment has the attachment surfaces 11 of the sliding member 10 as a tapped aperture 32 and a smooth guiding aperture 31 for the attachment surfaces 13 of the ring 12. An alternative embodiment has the attachment surfaces 11 of the sliding member 10 as a smooth guiding aperture 32 and tapped aperture 31 for the attachment surfaces 13 of the ring 12.

Figure 11A:
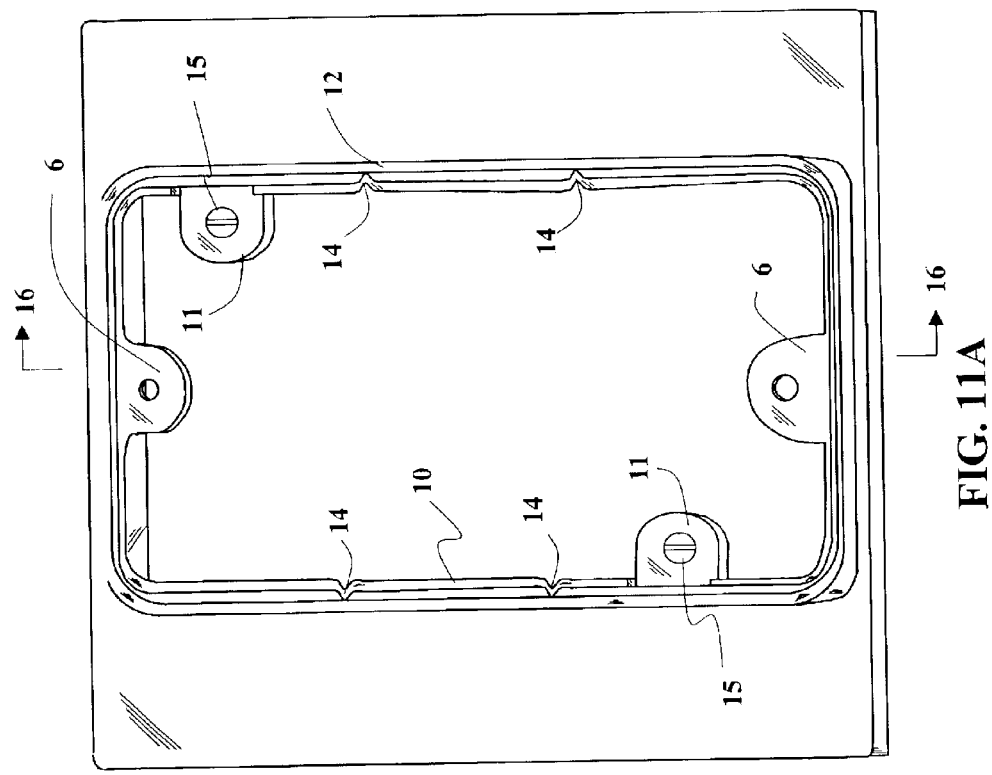
FIG. 11A is a top view of an assembly of an alternative embodiment of the present invention.
Figure 11B:
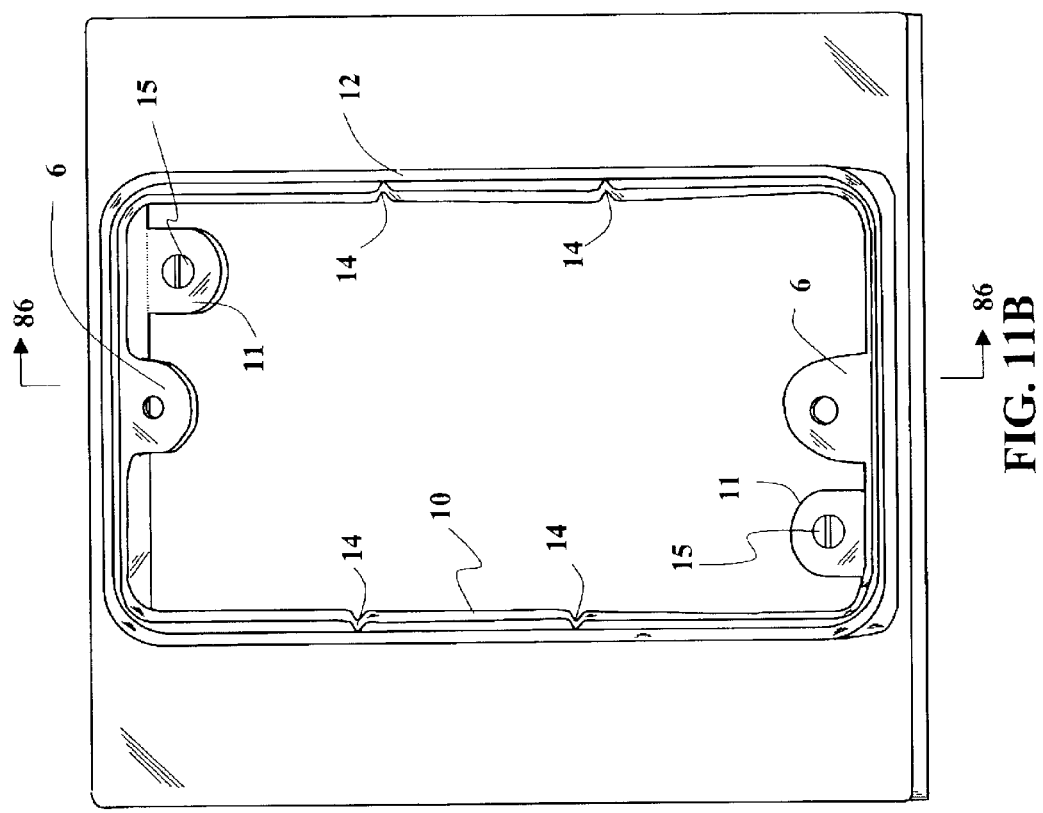
FIG. 11B is a top view of an assembly of an alternative embodiment of the present invention.

FIG. 11A illustrates from a top view the interaction of the protrusions 14 of the sliding member 10 with the inner walls of the ring 12. In this example, the fasteners 15 are in place connecting surfaces of the ring 10 and sliding member 12. FIG. 11B illustrates a similar embodiment where the brackets 11 are along the same sides as those having the plug-mounting bracket 6.

Figure 12C:
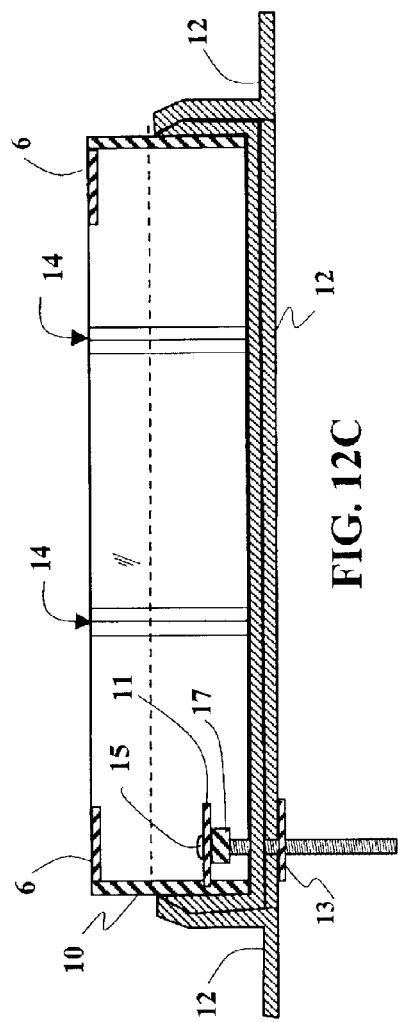
FIG. 12C is a cross-sectional view of an assembly of an alternative embodiment of the present invention.
Figure 12D:
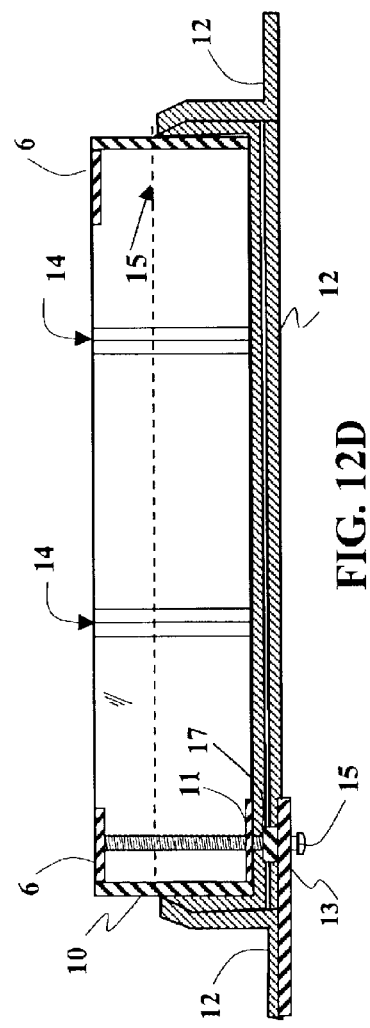
FIG. 12D is a cross-sectional view of an assembly of an alternative embodiment of the present invention.

Throughout FIGS. 12A–12D, horizontal, substantially continual, protrusions 14 are illustrated. Alternative embodiments have vertical, substantially continual protrusions, arrays of hemispherical protrusions, and other shapes protruding from at least one of extending member 10 outer walls. FIG. 12A is a cross-sectional view of FIG. 11A at 16 illustrating the fastener 15 connecting with the bracket surface of the ring 13 and the bracket surface of the sliding member surface 11. A grommet 17 is illustrated as attached to the fastener 15 at a point below the sliding member bracket surface 11 as an example of a means of constraining the travel of the sliding member bracket surface 11 along the fastener 15. Put another way, the grommet 17 is used to force the extending member 10 to travel and secures the screw 15 to which it is attached. FIG. 12B illustrates an embodiment where a spring is placed about the fastener 15 in tension between the bracket surfaces 11, 13. FIG. 12C is a cross-sectional view of FIG. 11B at 86 illustrating the fastener 15 connecting with the bracket surface of the ring 13 and the bracket surface of the sliding member surface 11. The grommet 17 is shown applying force to the extending member 10. FIG. 12D is a cross-sectional view of FIG. 11B at 86 where the fastener is oriented in a direction opposite to that of the fastener described in FIG. 12C. The grommet 17 is shown securing the screw 15 travel.

An alternative embodiment of the present invention illustrated in FIG. 13A has a sliding member 10 with a plurality of protrusions 18 fixedly attached to the surface of the sliding member 10 wall. For purposes of illustration, these plurality of protrusions 18 are shown running in, i.e., parallel with, the direction of travel 88 of the extending member 10. In alternative embodiments as illustrated in FIG. 13B with a portion of the extending member at least one protrusion 18 on at least one outer side of the extending member runs horizontal, i.e., perpendicular, to the direction of travel 88 of the extending member 10. In these embodiments, the sliding member 10 is attached and its elevation relative to a mounting surface adjusted with fasteners (not shown) inserted into attachment surface 11. In the several alternative embodiments of the invention, the plurality of protrusions 18 are pimples, ridges, or segments of electrically conductive material fixedly attached to the surface of the sliding member 10 wall sufficiently raising the surface of the sliding member 10 wall to cause electrical and mechanical contact with the ring 12 when the sliding member 10 is inserted into the ring 12.

An alternative embodiment of the present invention illustrated in FIG. 14 has a sliding member 10 with a plurality of protrusions 18 fixedly attached to the outer wall surface of the sliding member 10 and sized in elevation from the surface of the extending member 10 wall to cause friction and tension mounting when inserted into the adapting member or ring 12 (not shown). In this example embodiment, rather than using fasteners 15, the tight fitment and resulting stiction, i.e., the sticking friction between the plurality of protrusions 18 and the inner wall of the adapting member 12 sustain the mechanical and electrical contact with the adapting member 12. Alternative protrusion for this embodiment include pimples, ridges, or segments of electrically conductive material fixedly attached to the outer wall surface of the extending member 10.

Figure 15:
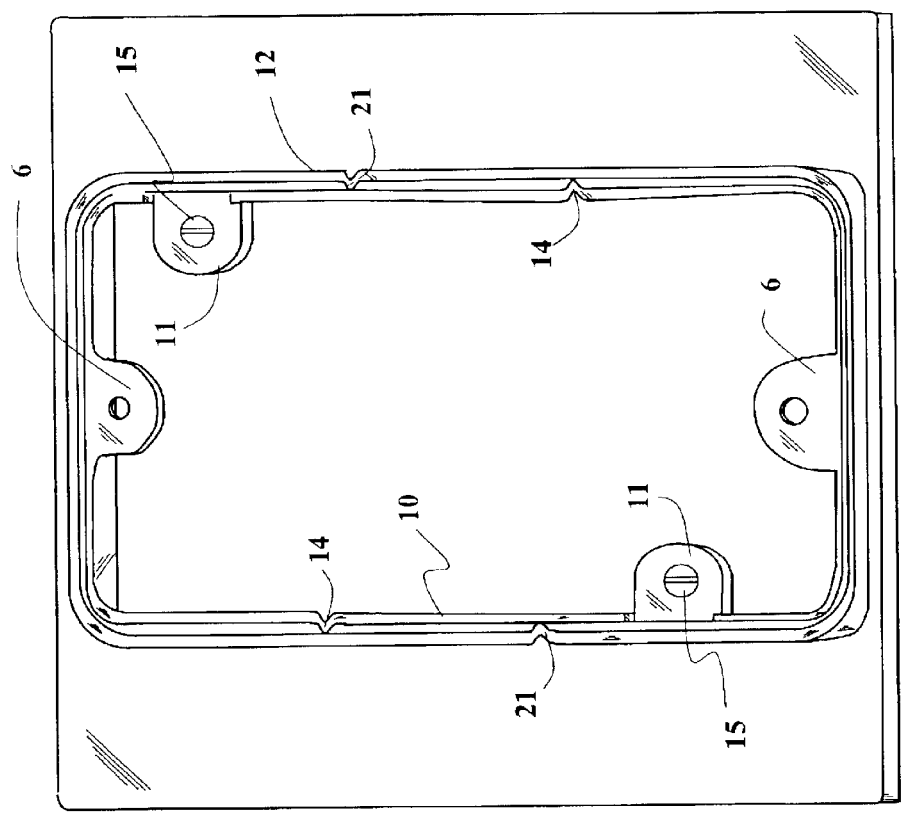
FIG. 15 is a top view of an assembly of an alternative embodiment of the present invention.

Alternative embodiments have the adapting ring 12 with protrusions, stamped or affixed, or otherwise, either separately or in combination with the sliding member 10. FIG. 15 illustrates stamped adapting member protrusions 21 of the adapting member 12 in combination with stamped extending member protrusions 14 of the sliding member 10. While some embodiments employ only the slider protrusions as shown in FIGS. 11 and 13 other embodiments employ only adapting member protrusions as shown in FIG. 15.

Figure 16:
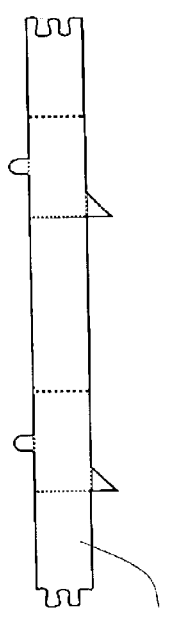
FIG. 16 is a platform view of an extending member of an alternative embodiment of the present invention.
Figure 17:
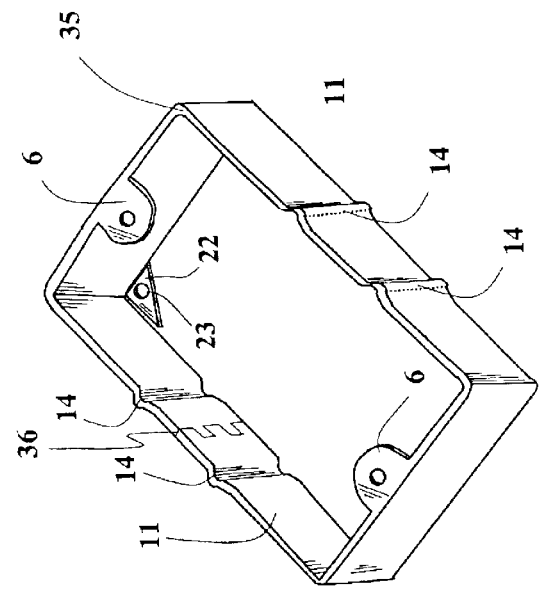
FIG. 17 is an extending member of an alternative embodiment of the present invention.

FIG. 16 illustrates an example form of an alternative embodiment of the slider, or extending member, before protrusions are stamped and other shaping has taken place. FIG. 17 illustrates the alternative elevation member 35, where the elevation member 35 is shaped into a tubular member and connected 36, the slider bracket, or upper bracket is formed 22, from a bent tab for example. The upper bracket has an aperture 23 that preferably receives a threaded fastener.

Figure 18:
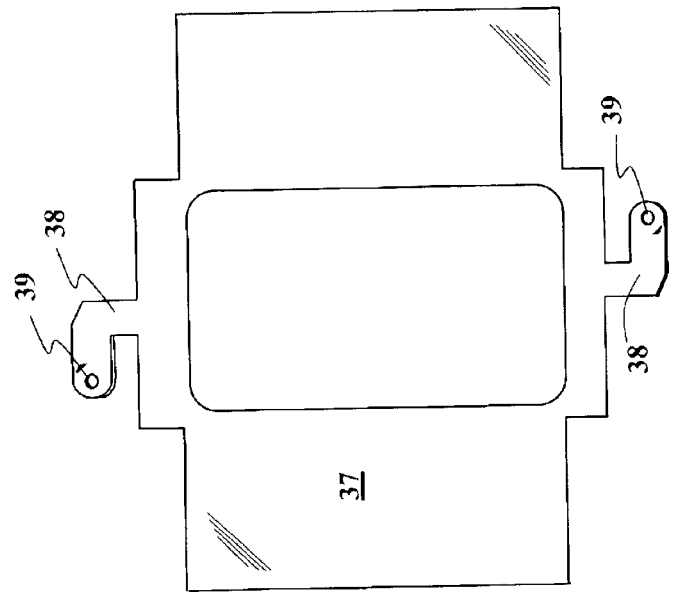
FIG. 18 is a platform of a mud ring member of an alternative embodiment of the present invention.
Figure 19:
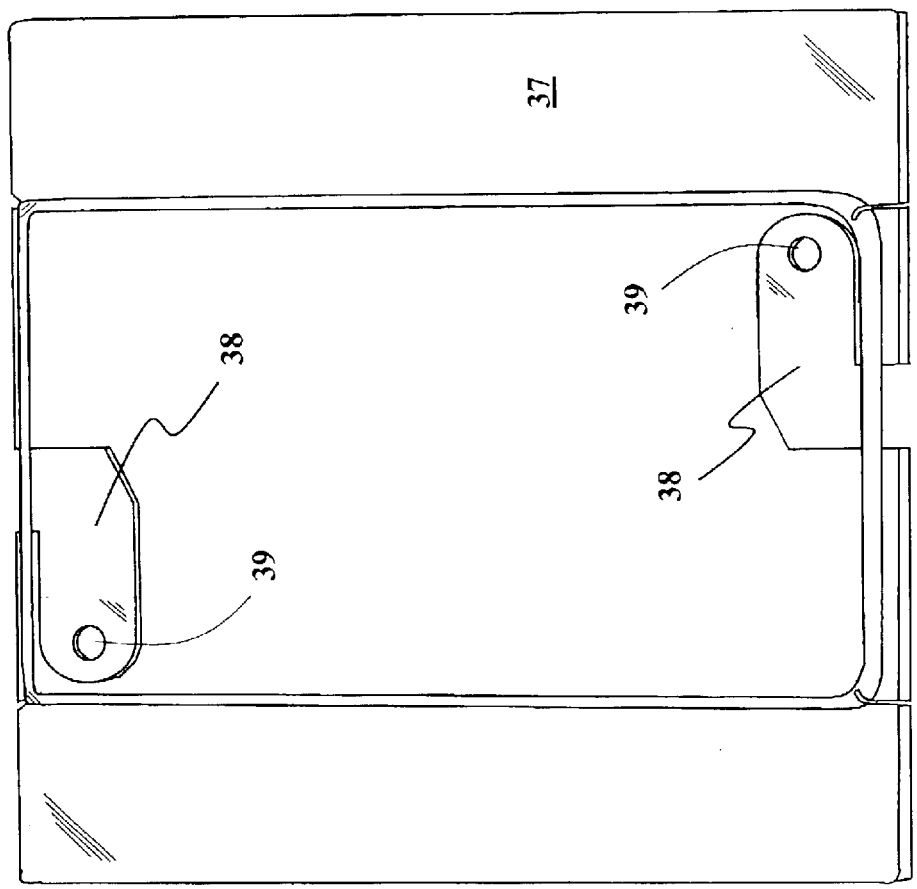
FIG. 19 is a top view of a mud ring member of an alternative embodiment of the present invention.

FIG. 18 illustrates a form of an alternative adapting member 37 with bracket portions 38 extended showing guiding apertures 39. Once stamped, the bracket portions are extended and shaped to provide a surface with a guiding aperture. A blank of an adapting member 37 such as the example of FIG. 18 may be stamped or otherwise drawn into the preferred shape, particularly with respect to the flange portion with the mounting bracket 38 preferably bent into shape. FIG. 19 illustrates a top view of an alternative adapting member 37 having the flange portion bent into shape with bracket portions 38 having guiding apertures 39.

Figure 20A:
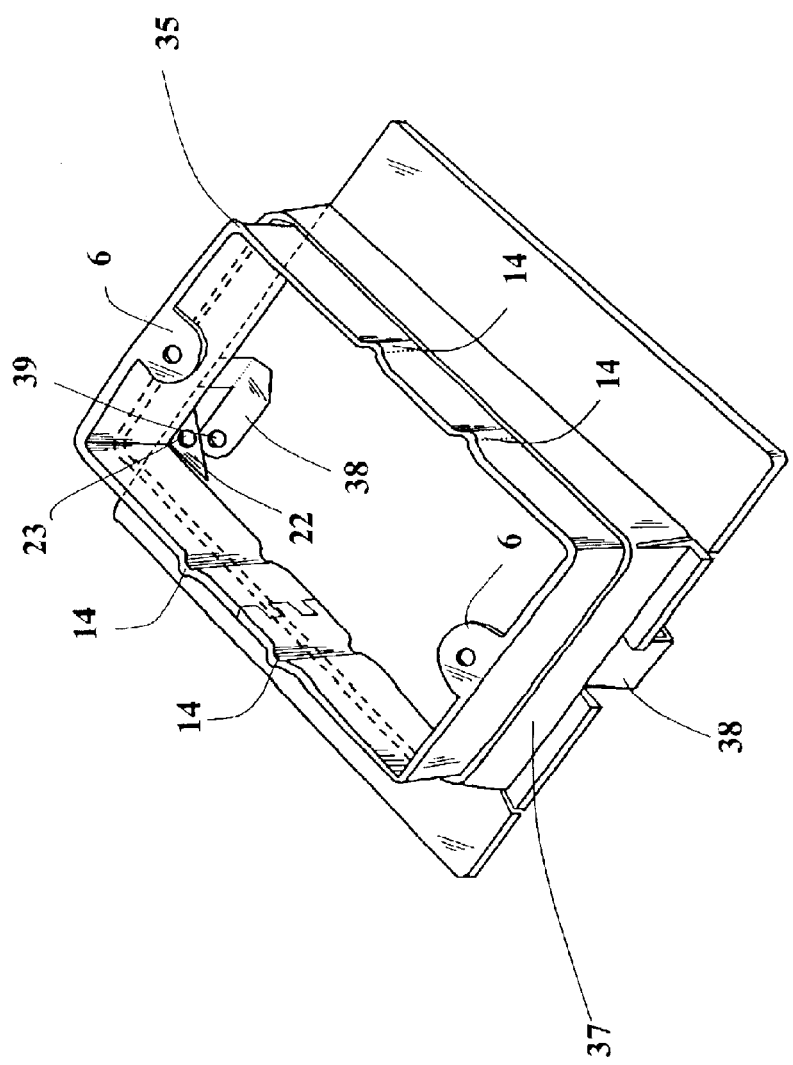
FIG. 20A is a perspective view of an extending member within an adapting member of an alternative embodiment of the present invention.
Figure 20B:
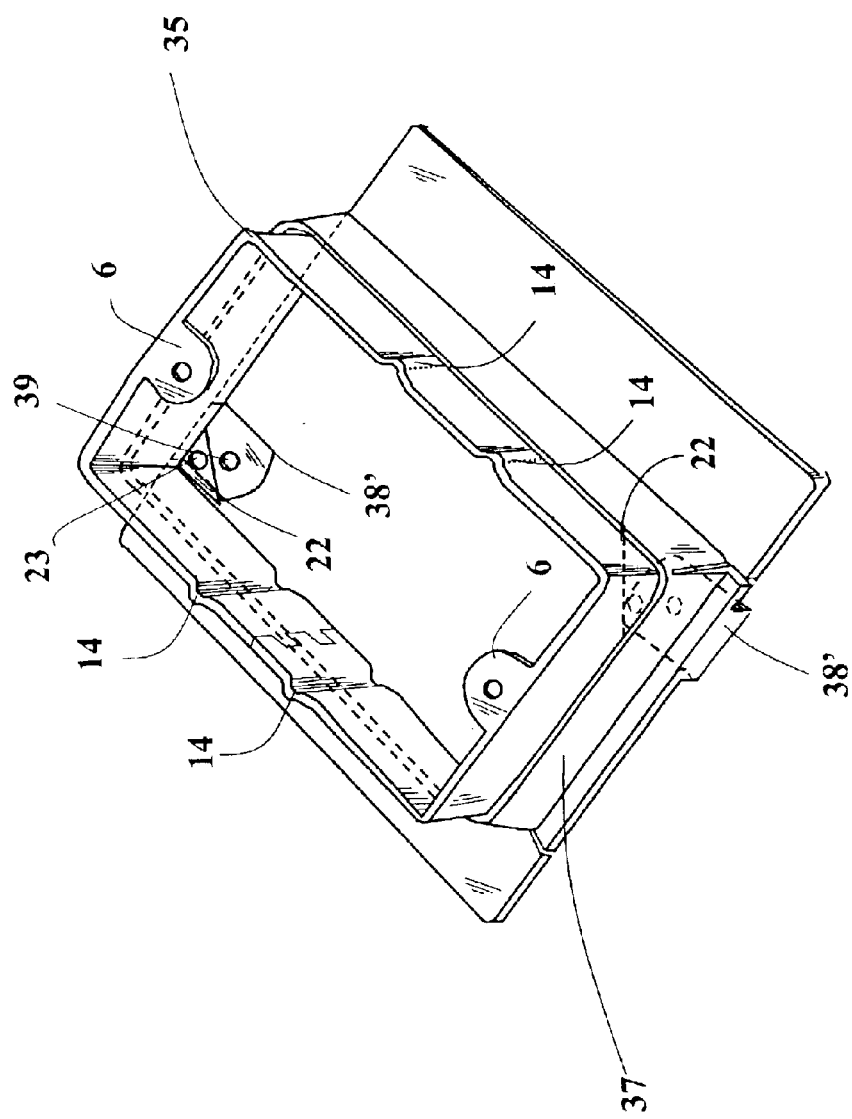
FIG. 20B is a perspective view of an extending member within an adapting member of an alternative embodiment of the present invention.

FIG. 20A illustrates in a perspective view the extending member 35 inserted into the ring member 37 so that the aperture 23 of the upper bracket 23 is aligned with the aperture 39 of the lower bracket 38. FIG. 20B illustrates in a perspective view the extending member 35 inserted into the adapting member 37 so that the aperture 23 of the upper bracket 22 is aligned with the aperture 39 of an alternative lower bracket 38'.

Figure 21:
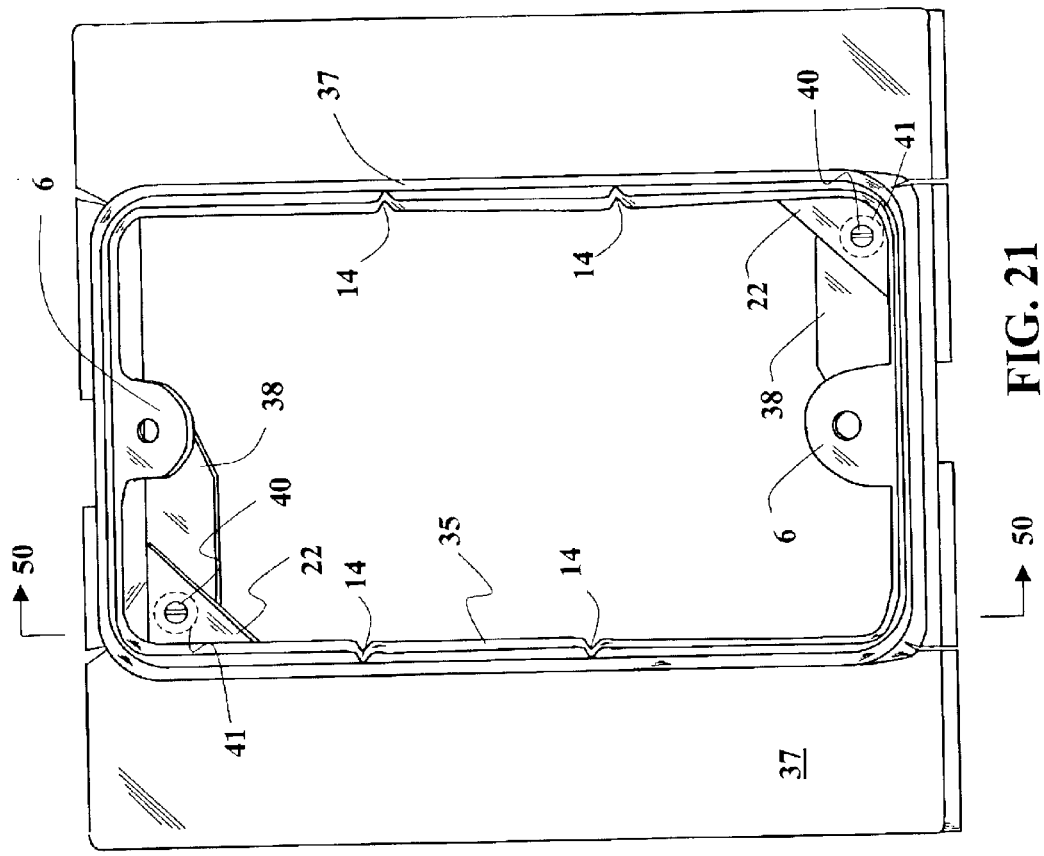
FIG. 21 is a top view of an assembly of an alternative embodiment of the present invention.
Figure 22:
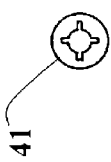
FIG. 22 is a top view of a washer of an alternative embodiment of the present invention.

FIG. 21 illustrates in a top view the extending member 35 inserted into the adapting member 37 showing the tapped end of a screw 40 with the screw 40 engaging the upper bracket 22 and the lower bracket 38. Also shown is a lock washer 41 for each screw 40. A top view of an example lock washer 41 is shown in FIG. 22.

FIG. 23A is a cross-sectional view of FIG. 21 at 50 illustrating the engagement of the upper bracket 22 and the lower bracket 38 via the elevating fasteners 40. Where tapped screws are used 40, lock washers 41 are also preferably used and grommets are used in alternative embodiments. FIG. 23B illustrates in cross-sectional view an alternative embodiment having springs 34 inserted between the upper brackets 22 and the lower brackets 38. The springs 34 provide force to the extending member 35 and work to aid in the extension process.

Figure 24:
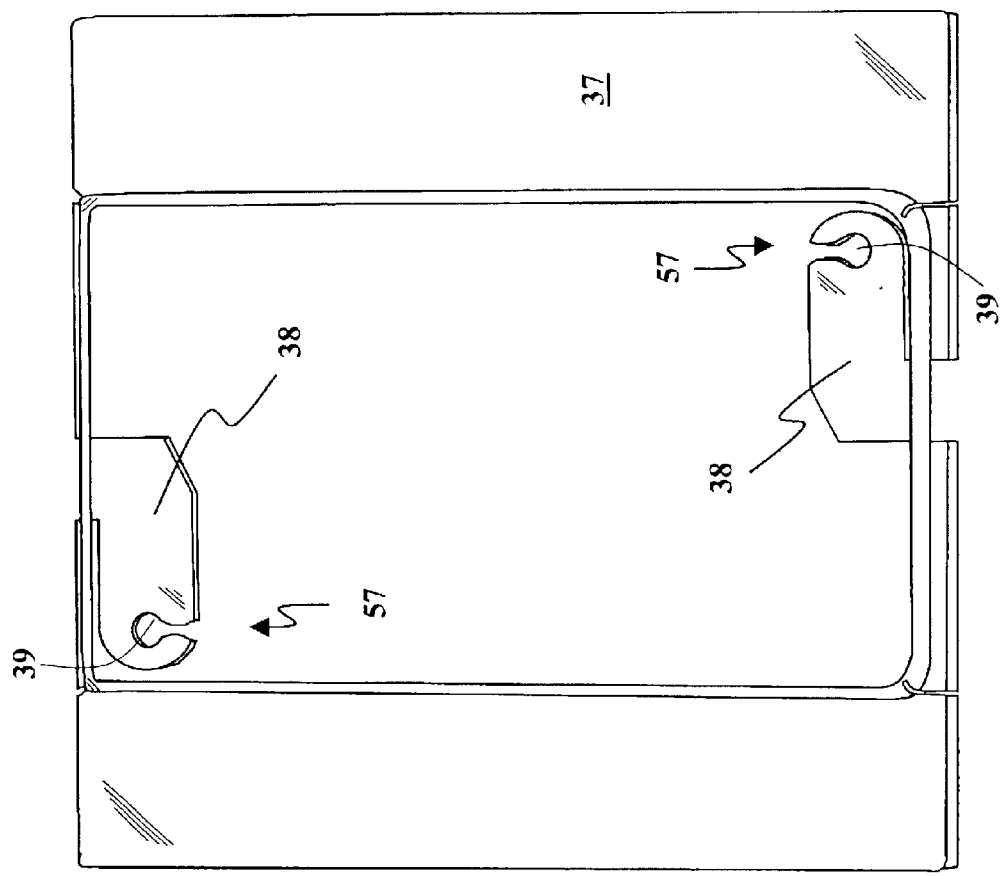
FIG. 24 is a top view of an adapting member of an alternative embodiment of the present invention.
Figure 25:
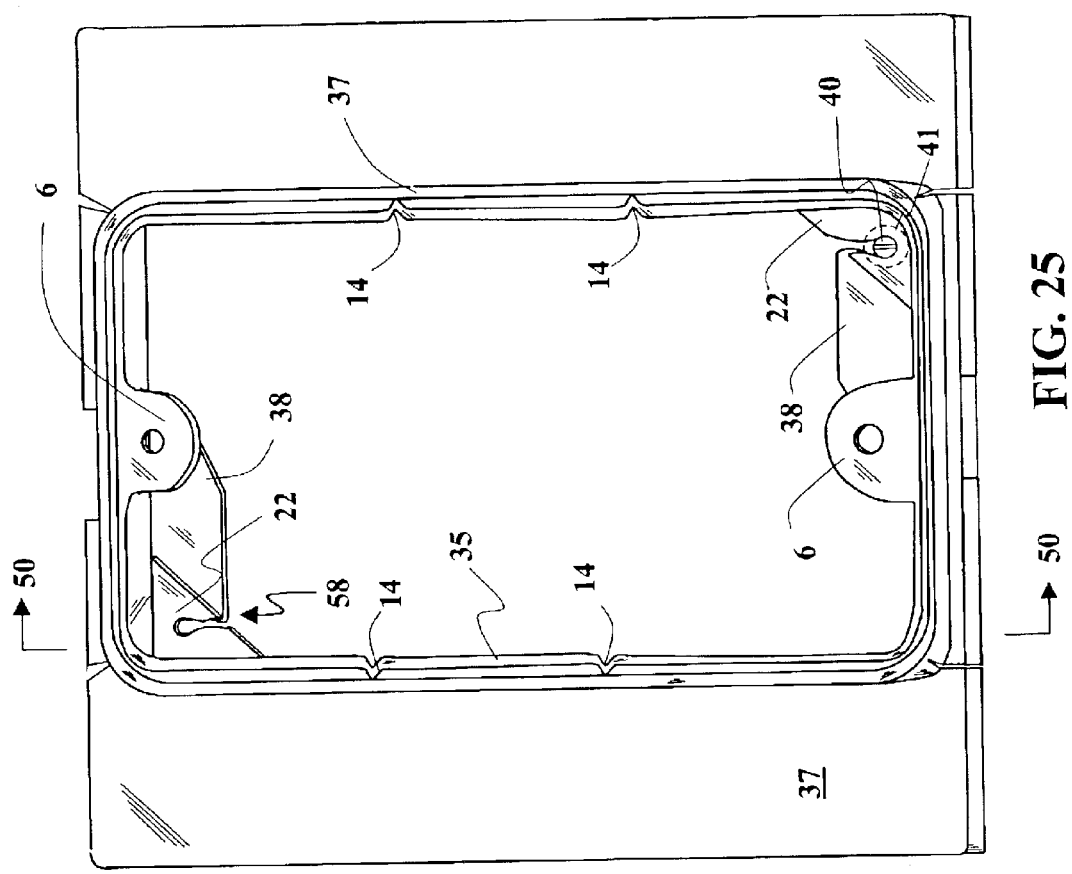
FIG. 25 is a top view of an assembly of an alternative embodiment of the present invention.

In several embodiments as illustrated in the example of FIG. 24, the adapting member first is installed with a bracket having an aperture 39 with later access 57. In this example, FIG. 25 illustrates the extending member is that is inserted into the adapting member also has apertures with lateral access 58. A fastener 40 having a washer 41 for example may be inserted into the aligned apertures laterally.

Figure 26:
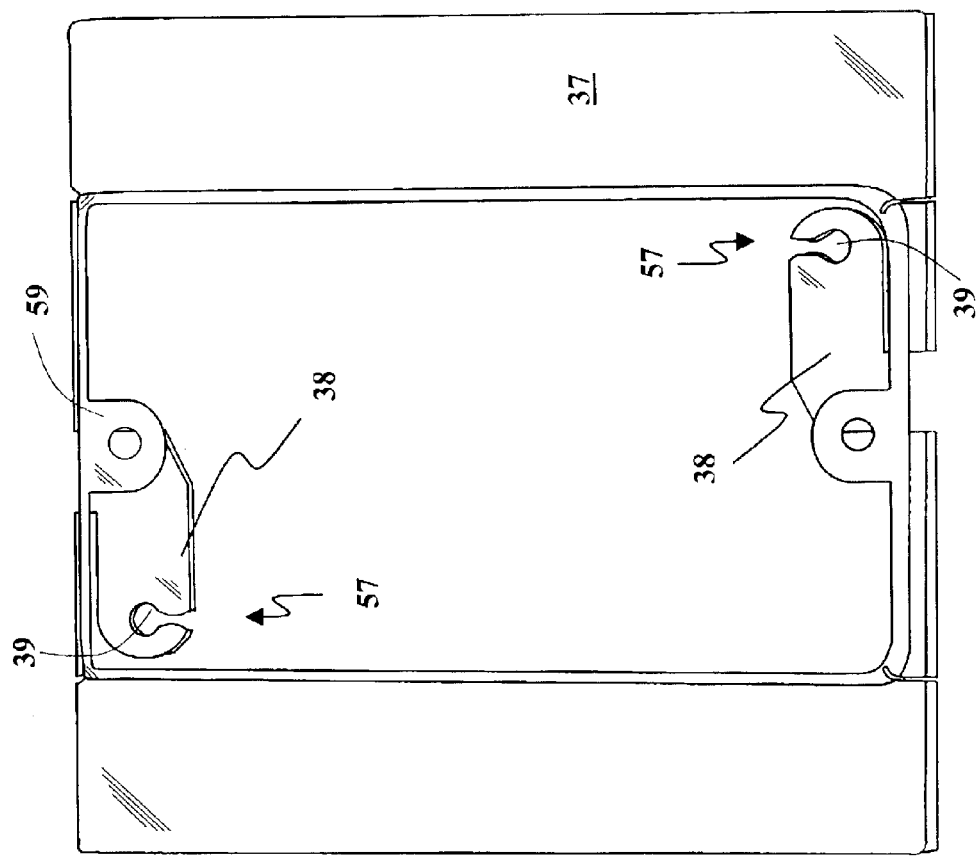
FIG. 26 is a top view of an adapting member of an alternative embodiment of the present invention.
Figure 28:
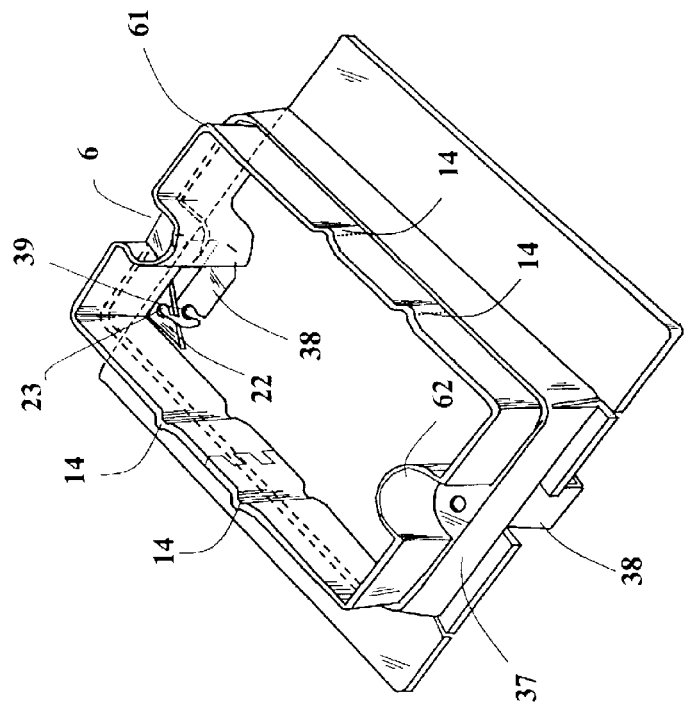
FIG. 28 is a perspective view of an assembly of an alternative embodiment of the present invention.
Figure 27:
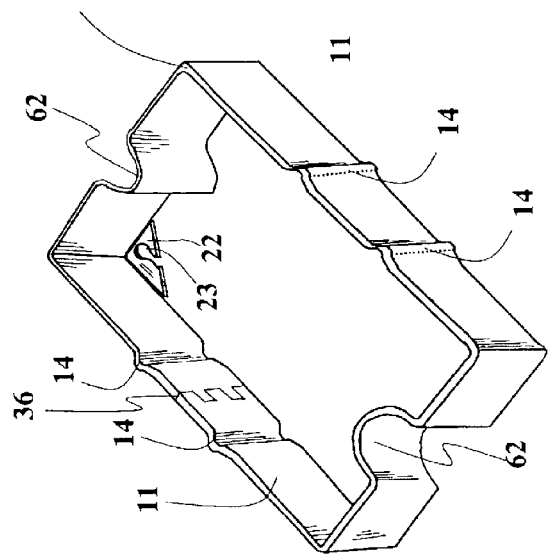
FIG. 27 is a perspective view of an extending member of an alternative embodiment of the present invention.
Figure 30:
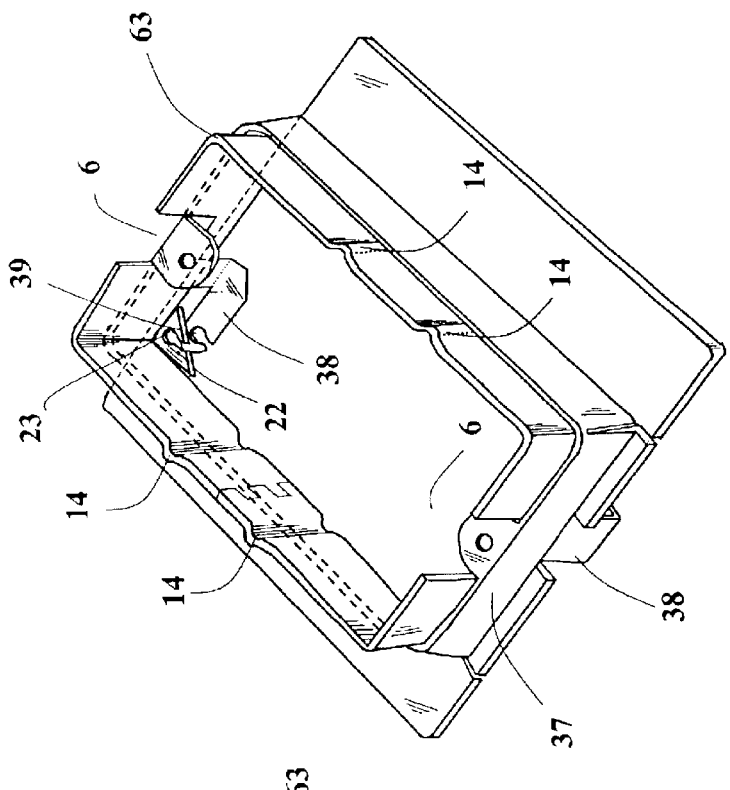
FIG. 30 is a perspective view of an assembly of an alternative embodiment of the present invention.
Figure 29:
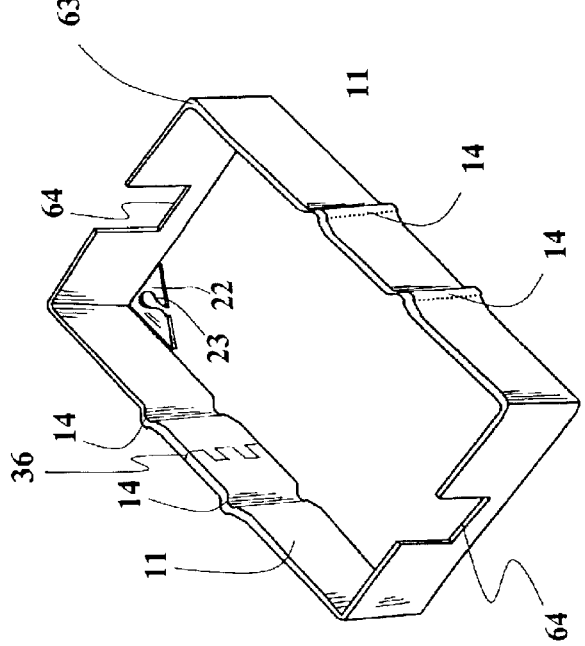
FIG. 29 is a perspective view of an extending member of an alternative embodiment of the present invention.

FIG. 26 illustrates an alternative embodiment of the adapting member 37 including at least one plug/switch mounting plate 59 and in this example, two plug/switch mounting plates. The example embodiment of FIG. 26 satisfies the typical functions of a mud ring but additionally supports a number of extending members including the following extending member examples that may be subsequently installed. FIG. 27 illustrates an extending member 61 where one or more walls of the extending member 61, and in this example two walls, are shaped so that the extending member passes around the plug/switch mounting plate by being substantially semi-circular in transverse cut 62 and accordingly the extending member shape supports full travel extending member 61. FIG. 28 illustrates the extending member 61 of FIG. 27 inserted within the flange portion of the adapting member 37. An alternative extending member 63 illustrated in FIG. 29 has a cut-out 64 along each of the one or more walls, and in this example two walls, of the extending member 63. FIG. 30 illustrates the extending member 63 of FIG. 29 inserted within the flange portion of the adapting member 37.

In several embodiments, one or more fasteners provide a mechanical means of extending and retracting the slider relative to the ring. While screws are preferred, other embodiments do not use fasteners and instead rely on the stiction provided by the ring and or slider protrusions acting against one another. An alternative to the screw faster is illustrated in FIGS. 31A–34F. In FIG. 31A, the front view of a comb pin 70 is illustrated. In the top view of the comb pin 70 (FIG. 31B), a groove 71 is provided for engagement with a flat screwdriver or equivalent tool. The side view (FIG. 31C) of the comb pin 70 shows the pin to be substantially flat. In FIG. 31D, the comb pin 70 is positioned to engage 76 representative upper 72 and lower brackets 74 having substantially slotted apertures 73, 75. The upper bracket 72 in this example is contiguous with an extending member (not shown) and the lower bracket 74 is contiguous with a ring member (not shown). FIG. 31S illustrates the insertion of the comb pin through the upper and lower brackets. With a ninety degree turn 78 of the comb pin 70, the spacing 79 between the upper 72 and lower brackets 74 is fixed by the comb pin as shown in a side view in FIG. 31F. The comb pin 70 thereby provides mechanical and electrical connectivity between the upper 72 and lower brackets 74. FIG. 31G illustrates an alternative embodiment wherein a spring 56 surrounds the portion of the comb pin 70 between the upper 72 and lower brackets 74 and is tension between these brackets 72, 74 providing additional mechanical support to the extending member and electrical connectivity between the extending member (not shown) and the adaptor or ring member (not shown).

Figure 32:
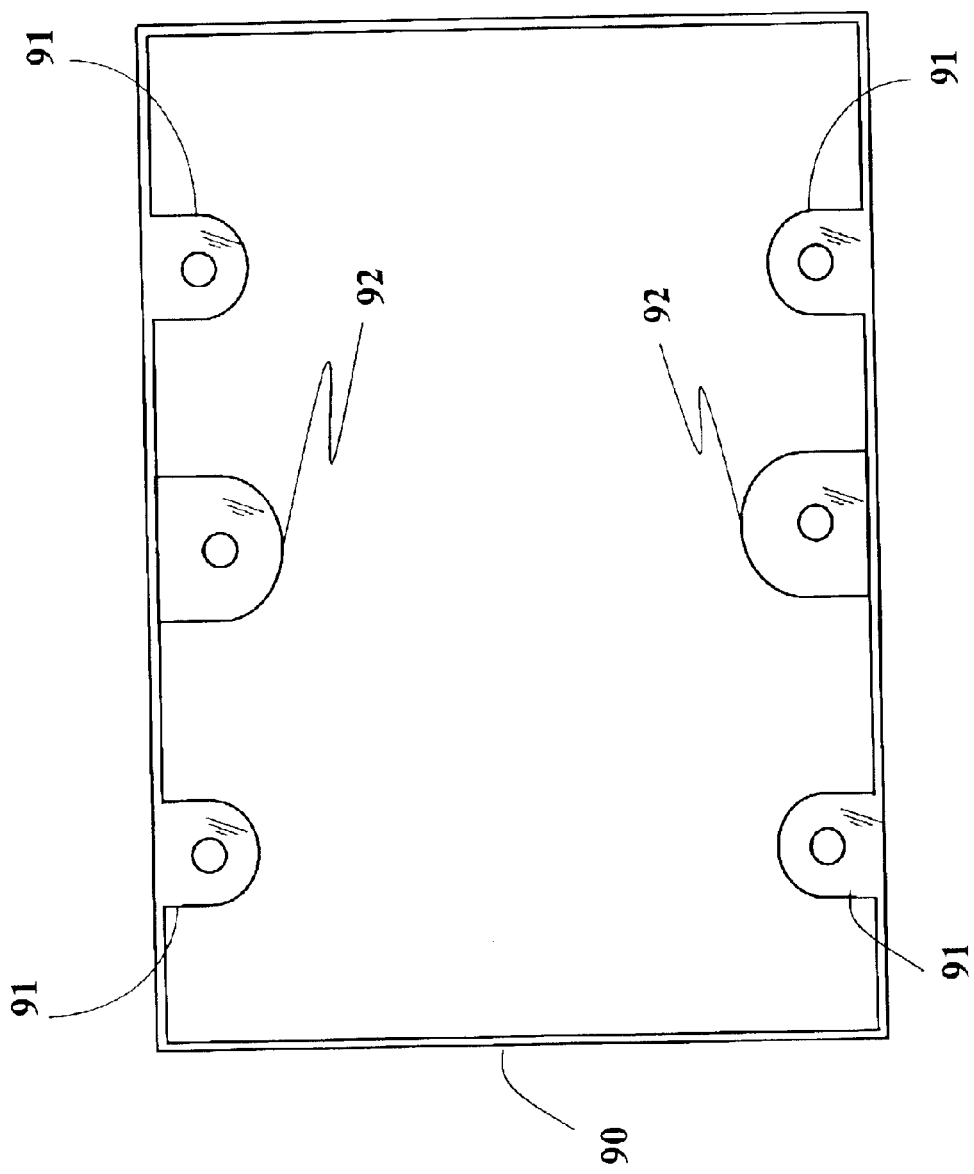
FIG. 32 is a top view of two-gang extending member embodiment of the present invention.
Figure 33:
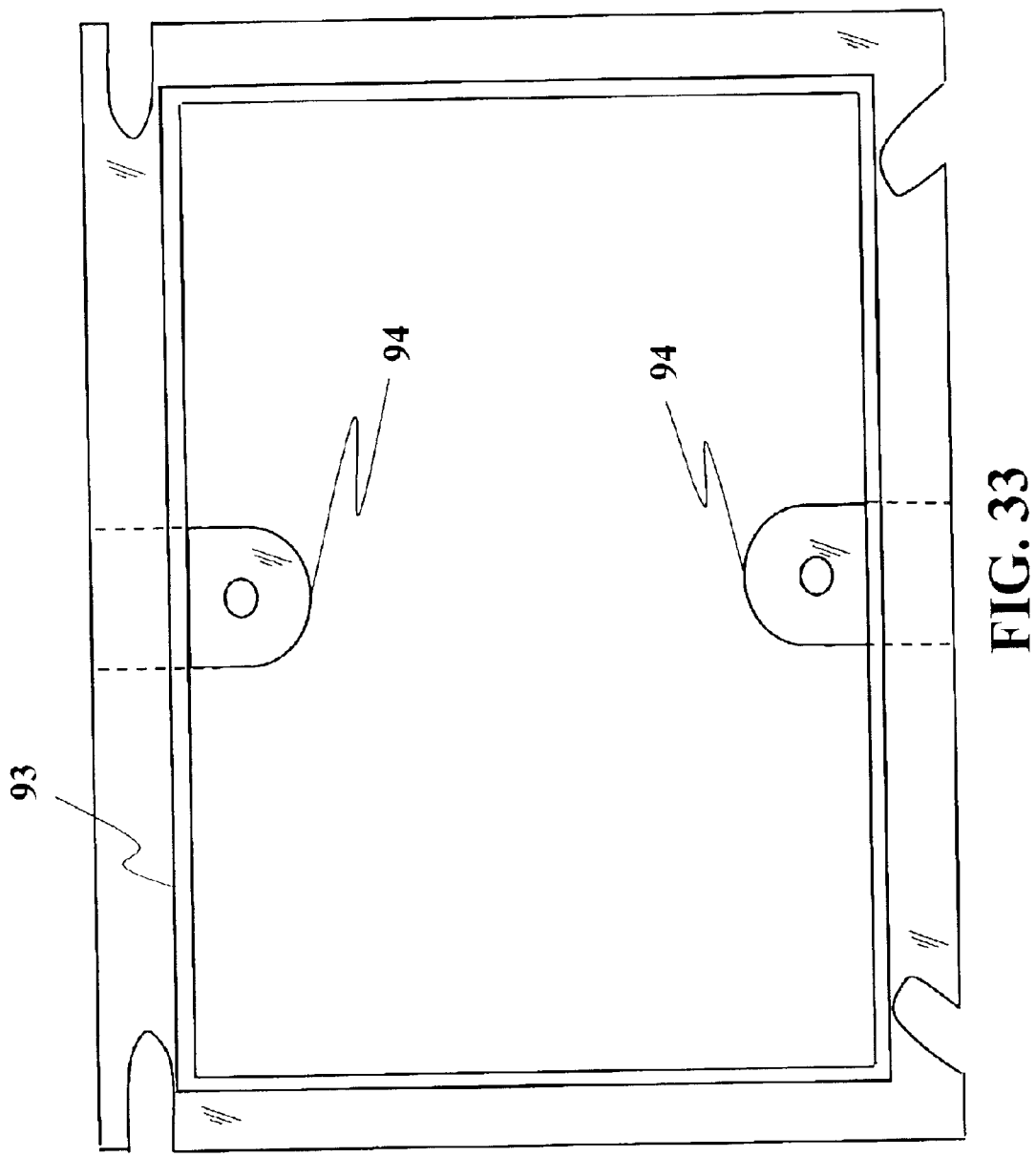
FIG. 33 is a top view of two-gang adapting member embodiment of the present invention.

FIG. 32 illustrates an example two-gang extending member 90 embodiment of the present invention. The switch/plug mounting plates 91 are each positioned to receive a switch or a plug and together mount two such devices in tandem. The upper brackets 92 of the elevating member 90 are, in this example, substantially aligned along a line of symmetry that also bisects the mounted plugs and/or switches. FIG. 33 illustrates an example two-gang adapting member 93 embodiment of the present invention. The lower brackets 94 of the adapting member 93 are substantially along the same line of symmetry as the upper brackets 92 (FIG. 32) of the elevating member 90. FIG. 34 illustrates the two-gang extending member inserted into the two-gang adapting member. As with the several embodiments of the single switch/plug electrical box extenders described above, the two-gang embodiments include the various fastening and elevating means and bracket embodiments for laterally insertable fasteners as disclosed above.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. While illustrated as a single assembly, the adapting member and, as an assembly, the extending member, are applicable to an array of attachable electrical devices and the adapting member and the assembly are applicable to an array of assemblies mounted to electrical boxes of extended size (e.g., elongated rectangles receiving several assemblies).

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. While the drawings reflect a electrical box, ring, or adapting member, and the sleeve, or extending member, all made of galvanized steel, the invention may be embodied with members each made of plastic, preferably fire resistant plastic, metal, preferably galvanized steel, ceramic or combinations thereof. In those embodiments having the electrical box, adapting member and extending member each made of plastics and ceramics or combinations thereof, it is preferred that electrical conductivity maintained by reverse thread screws as extending fasteners. In addition, the term electrical box is used generically to refer to grounded electrical housing of three-dimensional shapes including boxes of rectangular sides, boxes of square sides, and boxes of cylindrical shapes with circular or oval tops and bottoms or other shapes acceptable in the electrical applications and the grounded electrical housing may accommodate one or more plugs and or switches.

In addition to the equivalents of the claimed elements, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. An electrical box extender comprising:

an adapting member having an outward side and an inward side and having a flange substantially perpendicular to the adapting member and extending in the direction of the outward side of the adapting member; said flange having an inward side and an outward side; said flange bordering an aperture of said adapting member and oriented substantially about a principal axis of extension of said adapting member;

an extending member, having an inner surface and an outer surface the extending member oriented about the principal axis of extension of said adapting member and in close proximity to the inward side of said flange wherein the extending member has at least one protrusion extending from the outer wall contacting the inward side of the flange, the at least one protrusion oriented parallel with the principal axis of extesion;

at least one adaptor fastener mounting plate having an aperture for receiving a fastener with an aperture, the at least one adaptor fastener mounting plate extending from an edge of the adapting member ending in a direction toward the inward side of said flange and beneath said flange; each of the at least one adaptor fastener mounting plates having an associated extender fastener mounting plate for receiving a fastener, each extender fastener mounting plate fixedly attached to the extending member and having an aperture; each extender fastener mounting plate aperture substantially aligned with the associated adaptor fastener mounting plate aperture;

at least one fastener for detachably attaching said adapting member to said extending member by way of the aligned adaptor fastener mounting plate aperture and the extending fastening mounting plate aperture;

whereby travel of the extending member maintains mechanical and electrical connectivity between the extending member and the adapting member while modifying the height of the extending member reletive to the adapting member in an adjustable and substantially reversible fashion.

2. The electrical box extender as claimed in claim 1 wherein the extending member comprises a polyhedron-shaped surface with substantially rectangular-shaped facets about a principal axis of extension.

3. The electrical box extender as claimed in claim 1 wherein the at least one adaptor fastener mounting plate is an adaptor screw mounting plate, the at least one extender fastener mounting plate is an extender screw mounting plate, and the at least one fastener is at least one screw, each screw having a grommet attached to a portion of the screw between the at least one extender screw mounting plate and the at least one adaptor screw mounting plate, whereby the turning of the screw maintains mechanical connectivity between the adapting member and the extending member while modifying the height of the extending member relative to the adapting member in an adjustable and substantially reversible fashion.

4. The electrical box extender as claimed in claim 1 wherein the at least one adaptor fastener mounting plate is an adaptor screw mounting plate having an aperture for receiving a threaded fastener, the at least one extender fastener mounting plate is an extender screw mounting plate having a smooth aperture, and the at least one fastener is a screw having a grommet attached to a portion of the screw between the at least one extender screw mounting plate and the at least one adaptor screw mounting plate, whereby the turning of the screw maintains mechanical connectivity between the adapting member and the extending member while modifying the height of the extending member relative to the adapting member in an adjustable and substantially reversible fashion.

5. The electrical box extender as claimed in claim 1 further comprising a spring about each of the at least one fastener, each fastener having a head, wherein each spring is between the extender mounting plate and the screw head.

6. An electrical box extender comprising:
an adapting member having an outward side and an inward side and having a flange substantially perpendicular to the adapting member and extending in the direction of the outward side of the adapting member; said flange having an inward side and an outward side; said flange bordering an aperture of said adapting member and oriented substantially about a principal axis of extension of said adapting member; said adapting member further comprising at least one adaptor fastener mounting plate extending from an edge of the adapting member, each of the at least one adaptor fastener mounting plates having an end section with an aperture for receiving a fastener, each end section of the at least one adaptor fastener mounting plate extending substantially in the direction of the inward side of the flange and beneath said flange; each of the at least one adaptor fastener mounting plate having an associated extender fastener mounting plate having an aperture for receiving a fastener; each extender fastener mounting plate aperture substantially aligned with the associated adaptor fastener mounting plate aperture;
an extending member comprising a polyhedron-shaped surface with substantially rectangular-shaped facets about a principal axis of extension; the extending member having an inward surface and an outward surface, the extending member oriented about the principal axis extension of said adapting member with the outward surface of the extending member in close proximity to the inward side of said flange, wherein the outer surface of the extending member has at least one protrusion the at least one protrusion oriented parallel with the principle axis of extension in mechanical and electrical contact with the inward side of said flange and each extender fastener mounting plate is fixedly attached to the extending member; and
at least one fastener for detachably attaching said adapting member to said extending member by way of the aligned adapting member fastener mounting plate aperture and the aligned extending member fastener mounting plate;
whereby travel of the extending member maintains mechanical and electrical connectivity between the extending member and the adapting member while modifying the height of the extending member relative to the adapting member in an adjustable and substantially reversible fashion.

7. The electrical box extender as claimed in claim 6 wherein the at least one adaptor fastener mounting plate is an adaptor screw mounting plate, the at least one extender fastener mounting plate is an extender screw mounting plate, and the at least one fastener is at least one screw, each screw having a grommet attached to a portion of the screw between the at least one extender screw mounting plate and the at least one adaptor screw mounting plate, whereby the turning of the screw maintains mechanical connectivity between the adapting member and the extending member while modifying the height of the extending member relative to the adapting member in an adjustable substantially reversible fashion.

8. The electrical box extender as claimed in claim 7 further comprising a spring about each of the at least one screws, each fastener having a head, and wherein each spring is compression between the adaptor screw mounting plate and the head of each fastener.

9. The electrical box extender as claimed in claim 6 wherein the at least one adaptor fastener mounting plate is an adaptor screw mounting plate having an aperture for receiving a threaded fastener, the at least one extender fastener mounting plate is an extender screw mounting plate having a smooth aperture, and the at least one fastener is a screw having a grommet attached to a portion of the screw between the at least one extender screw mounting plate and the at least one adaptor screw mounting plate, whereby the turning of the screw maintains mechanical connectivity between the adapting member and the extending member while modifying the height of the extending member relative to the adapting member in an adjustable and substantially reversible fashion.

10. The electrical box extender as claimed in claim 9 further comprising a spring about each of the at least one screw, each screw having a head, wherein each spring is between the extender screw mounting plate and the screw head.

11. The electrical box extender as claimed in claim 6 wherein the at least one extender fastener mounting plate is an extender screw mounting plate having an aperture for receiving a threaded fastener, the at least one adaptor fastener mounting plate is an adaptor screw mounting plate having a smooth aperture, and the at least one fastener is a screw having a grommet attached to a portion of the screw between the at least one extender screw mounting plate and the at least one adaptor screw mounting plate, whereby the turning of the screw maintains mechanical connectivity between the adapting member and the extending member while modifying the height of the extending member relative to the adapting member in an adjustable and substantially reversible fashion.

12. The electrical box extender as claimed in claim 11 wherein each of the at least one screw has a head at a first end and an indentation at a second end.

13. The electrical box extender as claimed in claim 11 further comprising a spring about each of the at least one screw, each screw having a head, wherein each spring is between the adaptor screw mounting plate and the screw head.

14. An electrical box extender comprising:
an adapting member having an outward side and an inward side and having a flange substantially perpendicular to the adapting member and extending in the direction of the outward side of the adapting member;

said flange having an inward side and an outward side; said flange bordering an aperture of said adapting member and oriented substantially about a principal axis of extension of said adapting member; the inward side of the flange of the adapting member having at least one protrusion projecting into the adapting member aperture the at least one protrusion oriented parallel with the principal axis of extension; the adapting member further comprising at least one adaptor fastener mounting plate extending from an edge of the adapting member, each of the at least one adaptor fastener mounting plate having an end section with an aperture for receiving a fastener, each end section of the at least one adaptor fastener mounting plate extending substantially in the direction of inward side of the flange and beneath said flange; each of the at least one adaptor fastener mounting plate having an associated extender fastener mounting plate having an aperture for receiving a fastener; each extender fastener mounting plate aperture substantially aligned with the associated adaptor fastener mounting plate aperture;

an extending member comprising a polyhedron-shaped surface with substantially rectangular-shaped facets about a principal axis of extension; the extending member having an inward surface and an outward surface, the extending member oriented about the principal axis extension of said adapting member with the outward surface of the extending member in close proximity to the inward side of said flange and wherein the at least one protrusion of the adapting member is in mechanical and electrical contact with the outward surface of the extending member and each extender fastener mounting plate is fixedly attached to the extending member; and at least one fastener for detachably attaching said adapting member to said extending member by way of the aligned adapting member fastener mounting plate aperture and the aligned extending member fastener mounting plate;

whereby travel of the extending member maintains mechanical and electrical connectivity between the extending member and the adapting member while modifying the height of the extending member relative to the adapting member in an adjustable and substantially reversible fashion.

15. The electrical box extender as claimed in claim 14 wherein the at least one adaptor fastener mounting plate is an adaptor screw mounting plate, the at least one extender fastener mounting plate is an extender screw mounting plate, and the at least one fastener is at least one screw, each screw having a grommet attached to a portion of the screw between the at least one extender screw mounting plate and the at least one adaptor screw mounting plate, whereby the turning of the screw maintains mechanical connectivity between the adapting member and the extending member while modifying the height of the extending member relative to the adapting member in an adjustable and substantially reversible fashion.

16. The electrical box extender as claimed in claim 14 further comprising a spring about each of the at least one fastener wherein each spring is between the fastener mounting plate and adaptor fastener mounting associated with each fastener.

17. The electrical box extender as claimed in claim 14 wherein the at least one adaptor fastener mounting plate is an adaptor screw mounting plate having an aperture for receiving a threaded fastener, the at least one extender fastener mounting plate is an extender screw mounting plate having a smooth aperture, and the at least one fastener is a screw having a grommet attached to a portion of the screw between the at least one extender screw mounting plate and the at least one adaptor screw mounting plate, whereby the turning of the screw maintains mechanical connectivity between the adapting member and the extending member while modifying the height of the extending member relative to the adapting member in an adjustable and substantially reversible fashion.

18. The electrical box extender as claimed in claim 15 further comprising a spring about each of the at least one screw, each screw having a head, wherein each spring is between the extender screw mounting plate and the screw head.

19. The electrical box extender as claimed in claim 14 wherein the at least one extender fastener mounting plate is an extender screw mounting plate having an aperture for receiving a threaded fastener, the at least one adaptor fastener mounting plate is an adaptor screw mounting plate having a smooth aperture, and the at least one fastener is a screw having a grommet attached to a portion of the screw between the at least one extender screw mounting plate and the at least one adaptor screw mounting plate, whereby the turning of the screw maintains mechanical connectivity between the adapting member and the extending member while modifying the height of the extending member relative to the adapting member in an adjustable and substantially reversible fashion.

20. The electrical box extender as claimed in claim 19 wherein each of the at least one screw has a head at a first end and an indentation at a second end.

21. The electrical box extender an claimed in claim 15 further comprising a spring about each of the at least one screw, each screw having a head, wherein each spring is between the adaptor screw mounting plate and the screw head.

* * * * *